US012731433B2

(12) United States Patent
Kim

(10) Patent No.: US 12,731,433 B2
(45) Date of Patent: Sep. 8, 2026

(54) TARGET TRACKING METHOD AND APPARATUS BASED ON PATH

(71) Applicant: THINKWARE CORPORATION, Seongnam-si (KR)

(72) Inventor: Jong Min Kim, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 564 days.

(21) Appl. No.: 17/898,742

(22) Filed: Aug. 30, 2022

(65) Prior Publication Data

US 2023/0077662 A1 Mar. 16, 2023

(30) Foreign Application Priority Data

Sep. 1, 2021 (KR) ........................ 10-2021-0116257

(51) Int. Cl.
*G06V 40/16* (2022.01)

(52) U.S. Cl.
CPC .......... *G06V 40/174* (2022.01); *G06V 40/166* (2022.01); *G06V 40/168* (2022.01)

(58) Field of Classification Search
CPC .. G06V 40/174; G06V 40/166; G06V 40/168; G06V 20/52; G06V 40/172; G06V 40/18; G06V 40/161
See application file for complete search history.

(56) References Cited

U.S. PATENT DOCUMENTS 5,523,783 A * 6/1996 Cho ..................... H04N 23/695 348/157
12,149,822 B2 * 11/2024 Suzuki ................... H04N 23/66
2009/0080715 A1 * 3/2009 van Beek ............. A61B 5/0059 348/E7.087
2009/0237554 A1 * 9/2009 Kanayama ........... H04N 23/675 348/E5.042
2015/0016798 A1 * 1/2015 Fujimatsu ............. G06V 20/52 386/223
2019/0043207 A1 * 2/2019 Carranza et al. ...... G06V 20/52 382/103
2021/0168296 A1 6/2021 Su
2023/0209204 A1 * 6/2023 Zu ........................ H04N 23/611 348/207.99

(Continued)

FOREIGN PATENT DOCUMENTS

KR 10-0834465 B1 6/2008
KR 10-2008-0103586 A 11/2008

(Continued)

OTHER PUBLICATIONS

Office Action dated Dec. 17, 2025, issued in counterpart Korean patent application No. 10-2021-0116257 with English translation (12 pages).

*Primary Examiner* — Vu Le
(74) *Attorney, Agent, or Firm* — WHDA, LLP

(57) ABSTRACT

Disclosed are a target tracking method and apparatus based on a path. The target tracking method may include displaying an image that is received through a camera included in a target tracking apparatus on a display included in the target tracking apparatus, setting two or more points based on the image displayed on the display, and tracking a path that is determined based on the two or more points by controlling a rotation of the camera through a driving unit included in the target tracking apparatus.

18 Claims, 39 Drawing Sheets

(56) References Cited

U.S. PATENT DOCUMENTS

2024/0056686 A1* 2/2024 Tsunashima ........... H04N 23/61

FOREIGN PATENT DOCUMENTS

| | | | | |
|---|---|---|---|---|
| KR | 10-2014-0006548 | A | 1/2014 | |
| KR | 10-1533686 | B1 | 7/2015 | |
| KR | 10-2015-0121056 | A | 10/2015 | |
| KR | 10-1756617 | B1 | 7/2017 | |
| KR | 10-1967720 | B1 | 4/2019 | |
| WO | WO2020078440 | A1 * | 4/2020 | ............. H04N 23/60 |

* cited by examiner

TARGET TRACKING METHOD AND APPARATUS BASED ON PATH

CROSS-REFERENCES TO RELATED APPLICATIONS

This application is based on and claims priority under 35 U.S.C. 119 to Korean Patent Application No. 10-2021-0116257, filed on Sep. 1, 2021, in the Korean intellectual property office, the disclosures of which are herein incorporated by reference in their entireties.

TECHNICAL FIELD

The following description relates to a target tracking method and apparatus based on a path.

BACKGROUND OF THE DISCLOSURE

A gimbal on which a motor and a sensor are mounted is an apparatus for enabling a digital camera to smoothly rotate around an axis thereof. A 3-axis gimbal is the most common type. The gimbal can stabilize the camera while tilting, panning, or rolling, and may help a smooth and slick image to be photographed while moving.

PRIOR ART DOCUMENT

Korean Patent No. 10-1967720

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments provide a target tracking method and apparatus, which can register a face of a person and track a recognized face of the person when the registered face is recognized.

Embodiments provide a target tracking method and apparatus, which can provide a function capable of differently indicating a registered face and an unregistered face and immediately registering the unregistered face.

Embodiments provide a target tracking method and apparatus, which can register a plurality of faces and simultaneously track a plurality of persons.

Embodiments provide a target tracking method and apparatus, which can set priorities for registered faces and track a target based on the set priorities.

Embodiments provide a target tracking method and apparatus, which can set the tracking sensitivity of a gimbal and adjust the rotation sensitivity of a camera based on the set sensitivity.

Embodiments provide a target tracking method and apparatus, which can maintain the tracking of a target although a face of a tracking target is not seen and track a thing that is selected by a user, by recognizing even a peripheral area (e.g., a shoulder line of a person or a thing) by using a plurality of recognition engines.

Embodiments provide a target tracking method and apparatus, which can set a path according to a plurality of points and automatically adjusting the rotation of a camera so that the photographing of the camera is performed along the set path.

Embodiments provide a target tracking method and apparatus, which can provide a user interface capable of indicating a path progress state when photographing is performed along a set path.

Embodiments provide a target tracking method and apparatus, which can track a specific location of a virtual coordinate system based on the head direction of a user or a gaze of the user.

Embodiments provide a target tracking method and apparatus, which can track a target based on priorities according to various modes.

Embodiments provide a target tracking method and apparatus, which can quickly set and activate or deactivate a gimbal control mode by using a trigger button.

Embodiments provide a target tracking method and apparatus, which can provide both a transverse mode and a longitudinal mode.

In an embodiment, a target tracking method of a target tracking apparatus including at least one processor includes displaying, by the at least one processor, an image that is received through a camera included in the target tracking apparatus on a display included in the target tracking apparatus, setting, by the at least one processor, two or more points based on the image displayed on the display, and tracking, by the at least one processor, a path that is determined based on the two or more points by controlling a rotation of the camera through a driving unit included in the target tracking apparatus.

According to an aspect, the target tracking method may further include further indicating, by the at least one processor, identifiers indicative of the two or more points and a mark indicative of path progress information for the two or more points in an image that is being displayed on the display.

According to another aspect, the mark may include at least one of a first mark for indicating a path along which the camera has already moved, a second mark for indicating a path along which the camera is currently moving, and a third mark for indicating a path to which the camera has not entered.

According to still another aspect, the target tracking method may further include providing, by the at least one processor, a photographing duration setting function for setting photographing duration. Tracking the path may include controlling the rotation of the camera so that the camera moves along the path for photographing duration that is set by using the photographing duration setting function.

According to still another aspect, the target tracking method may further include providing, by the at least one processor, a repetition setting function for setting whether to repeatedly track the path. Tracking the path may include controlling the rotation of the camera so that the camera repeatedly tracks the path when the path is set to be repeatedly tracked through the repetition setting function.

According to still another aspect, tracking the path may include terminating the tracking of the path and tracking a registered face when the registered face appears in the received image while tracking the path.

According to still another aspect, the target tracking method may further include receiving, by the at least one processor, information that is generated by a terminal device based on a movement of a gyro sensor included in the terminal device owned by a user, and tracking, by the at least one processor, a head direction of the user by controlling the rotation of the camera through the driving unit based on the received information.

According to still another aspect, the received information may include information on target virtual coordinates that are set based on the movement of the gyro sensor in a virtual coordinate system of the terminal device.

According to still another aspect, the target tracking method may further include recognizing, by the at least one processor, a gaze direction of a user in the received image, and tracking, by the at least one processor, a head direction of the user by controlling the rotation of the camera through the driving unit based on the recognized gaze direction.

According to still another aspect, the target tracking method may further include registering, by the at least one processor, a face of a person that is recognized by analyzing the received image, and providing a face tracking mode in which the registered face is tracked and a head tracking mode in which a head direction of a recognized user is tracked, and when a registered face appears in the received image while tracking the head direction in the head tracking mode, deactivating, by the at least one processor, the head tracking mode and tracking the registered face in the face tracking mode.

According to still another aspect, the target tracking apparatus may include a trigger button. The target tracking method may further include setting, by the at least one processor, a plurality of gimbal control modes by sequentially selecting the plurality of gimbal control mode whenever the trigger button is pressed, and activating, by the at least one processor, a gimbal control mode that has been currently set, among the plurality of gimbal control modes, when the trigger button is held in the state in which the trigger button has been pressed.

According to still another aspect, the driving unit may include a pan axis, a roll axis, and a tilt axis. The plurality of gimbal control modes may include at least two gimbal control modes of (1) a pan mode in which the roll axis and the tilt axis are locked except the pan axis, (2) a Fallow mode in which the roll axis is locked except the pan axis and the tilt axis, (3) a first person view (FPV) mode in which all of the pan axis, the roll axis, and the tilt axis are capable of operating, (4) a lock mode in which all of the pan axis, the roll axis, and the tilt axis are locked, and (5) a non mode in which any gimbal control mode is not activated in the state in which the trigger button has been held.

According to still another aspect, the target tracking method may further include further displaying, by the at least one processor, information on the activated gimbal control mode on the display.

According to still another aspect, the target tracking method may further include changing, by the at least one processor, a mode of the camera to a longitudinal mode by rotating a roll axis motor included in the driving unit by 90 degrees and fixing the rotated roll axis motor when the mode of the camera is changed from a transverse mode to the longitudinal mode.

According to still another aspect, the driving unit may include a pan axis motor, a roll axis motor, and a tilt axis motor. The roll axis motor may be counterclockwise rotated so that the tilt axis motor disposed on the left of the camera is disposed downward from the camera in the transverse mode based on the state in which the front of the target tracking apparatus is viewed.

In an embodiment, there is provided a computer-readable recording medium on which a program for executing the method in a computer device is recorded.

In an embodiment, a target tracking apparatus includes at least one processor implemented to execute a computer-readable instruction, a camera receiving an image, a display displaying the received image, and a driving unit rotating the camera. The at least one processor is implemented to display, on a display, an image that is received through the camera, set two or more points based on the image displayed on the display, and track a path that is determined based on the two or more points by controlling the rotation of the camera through the driving unit.

A face of a person can be registered, and a recognized face of the person can be tracked when the registered face is recognized.

A function capable of differently indicating a registered face and an unregistered face and immediately registering the unregistered face can be provided.

A plurality of faces can be registered, and a plurality of persons can be simultaneously tracked.

Priorities for registered faces can be set, and a target can be tracked based on the set priorities.

The tracking sensitivity of a gimbal can be set, and the rotation sensitivity of a camera can be adjusted based on the set sensitivity.

By recognizing even a peripheral area (e.g., a shoulder line of a person or a thing) by using a plurality of recognition engines, the tracking of a target can be maintained although a face of a tracking target is not seen, and a thing that is selected by a user can be tracked.

A path according to a plurality of points can be set, and the rotation of a camera can be automatically adjusted so that the photographing of the camera is performed along the set path.

A user interface capable of indicating a path progress state when photographing is performed along a set path can be provided.

A specific location of a virtual coordinate system can be tracked based on the head direction of a user or a gaze of the user.

A target can be tracked based on priorities according to various modes.

The gimbal control mode can be quickly set and activated or deactivated by using the trigger button.

Both the transverse mode and the longitudinal mode can be provided.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
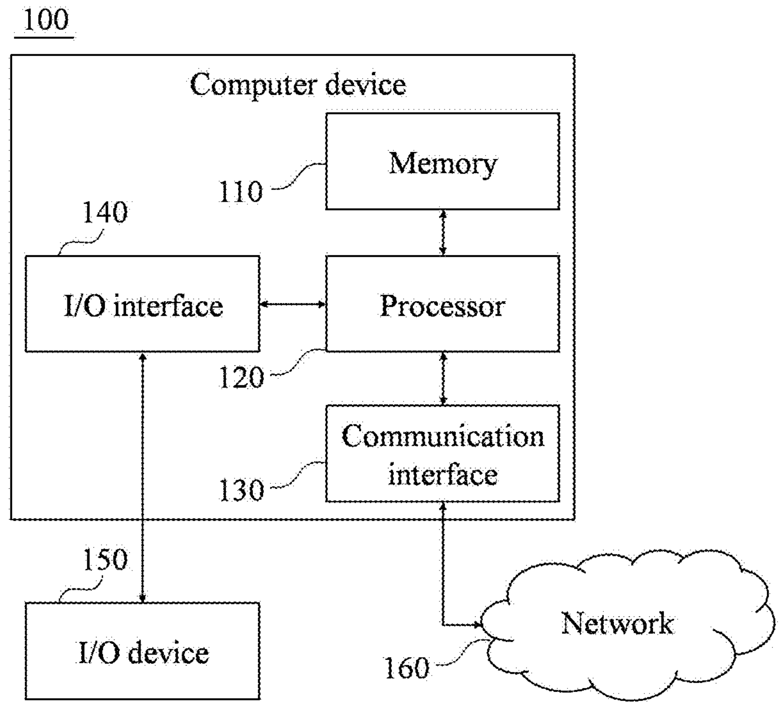
FIG. 1 is a block diagram illustrating an example of a computer device according to an embodiment of the present disclosure.

While illustrative embodiments have been illustrated and described, it will be appreciated that various changes can be made therein without departing from the spirit and scope of the disclosure.

Hereinafter, embodiments are described in detail with reference to the accompanying drawings.

A target tracking apparatus according to embodiments of the present disclosure may include at least one computer device. A target tracking method according to embodiments of the present disclosure may be performed through at least one computer device included in the target tracking apparatus. A computer program according to an embodiment of the present disclosure may be installed and driven in the computer device. The computer device may perform a target tracking method according to embodiments of the present disclosure under the control of the driven computer program. The aforementioned computer program may be stored in a computer-readable recording medium in order to execute the target tracking method in a computer device in association with the computer device.

Hereinafter, embodiments are described in detail with reference to the accompanying drawings. The same reference numeral that is present in each drawing denotes the same member.

FIG. 1 is a block diagram illustrating an example of a computer device according to an embodiment of the present disclosure. As illustrated in FIG. 1, a computer device 100 may include a memory 110, a processor 120, a communication interface 130, and an input/output (I/O) interface 140. The memory 110 is a computer-readable recording medium, and may include permanent mass storage devices, such as random access memory (RAM), read only memory (ROM), and a disk drive. In this case, the permanent mass storage device, such as a ROM and a disk drive, may be included in the computer device 100 as a permanent storage device separated from the memory 110. Furthermore, an operating system and at least one program code may be stored in the memory 110. Such software components may be loaded onto the memory 110 from a computer-readable recording medium separated from the memory 110. Such a separate computer-readable recording medium may include computer-readable recording media, such as a floppy drive, a disk, a tape, a DVD/CD-ROM drive, and a memory card. In another embodiment, software components may be loaded onto the memory 110 through the communication interface 130 not a computer-readable recording medium. In another embodiment, the software components may be loaded onto the memory 110 through the communication interface 130 other than a computer-readable recording medium. For example, the software components may be loaded onto the memory 110 of the computer device 100 based on a computer program installed by files received over a network 160.

The processor 120 may be configured to process instructions of a computer program by performing basic arithmetic, logic and input/output (I/O) operations. The instructions may be provided to the processor 120 by the memory 110 or the communication interface 130. For example, the processor 120 may be configured to execute received instructions based on a program code stored in a recording device, such as the memory 110.

The communication interface 130 may provide a function for enabling the computer device 100 to communicate with other devices over the network 160. For example, a request, a command, data or a file generated by the processor 120 of the computer device 100 based on a program code stored in a recording device, such as the memory 110, may be provided to other devices over the network 160 under the control of the communication interface 130. Inversely, a signal, a command, data or a file from another device may be received by the computer device 100 through the communication interface 130 of the computer device 100 over the network 160. A signal, a command or a file received through the communication interface 130 may be transmitted to the processor 120 or the memory 110. A file received through the communication interface 130 may be stored in a storage medium (e.g., the aforementioned permanent storage device) which may be further included in the computer device 100.

The I/O interface 140 may be means for an interface with an I/O device 150. For example, the input device may include a device, such as a microphone, a keyboard, or a mouse. The output device may include a device, such as a display or a speaker. Furthermore, for example, the I/O interface 140 may be means for an interface with a device in which functions for input and output have been integrated into one, such as a touch screen. The I/O device 150, together with the computer device 100, may be configured as a single device.

Furthermore, in other embodiments, the computer device 100 may include components greater or smaller than the components of FIG. 1. However, it is not necessary to clearly illustrate most of conventional components. For example, the computer device 100 may be implemented to include at least some of the I/O devices 150 or may further include other components, such as a transceiver and a database.

Figure 2:
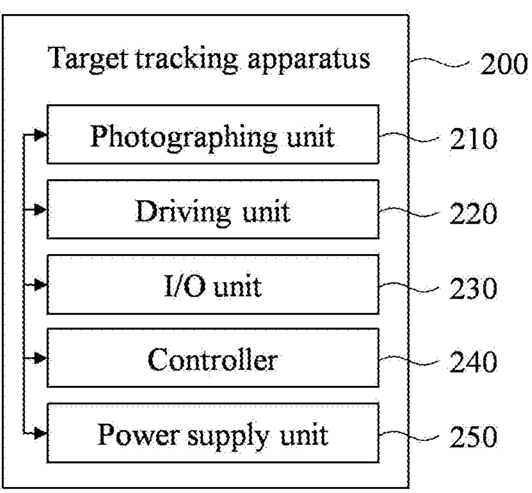
FIG. 2 is a diagram illustrating an example of internal components of a target tracking apparatus according to an embodiment of the present disclosure.

FIG. 2 is a diagram illustrating an example of internal components of a target tracking apparatus according to an embodiment of the present disclosure. The target tracking apparatus 200 according to the present embodiment may include a photographing unit 210, a driving unit 220, an I/O unit 230, a controller 240, and a power supply unit 250.

The photographing unit 210 may capture and/or generate an image. For example, hardware specifications of a camera included in the photographing unit 210 may be the same as those in Table 1, but this is merely an example. The hardware specifications of the camera included in the photographing unit 210 are not limited to those in Table 1. Furthermore, the photographing unit 210 may include a repository therein, such as the SD card in Table 1, and may store an image in the SD card. In some embodiments, an image may be stored in a separate repository which may be included in the target tracking apparatus 200.

TABLE 1

| | | |
|---|---|---|
| Camera | Sensor | 1/2.3" CMOS/12.3 M (IMX477) |
| | Lens | FOV: 133° F. 2.8 |
| | Maximum image size | 4,056 × 3,040 |
| | Resolution of video | [NTSC]<br>4 K @ 60, 30 fps<br>2.7 K @ 60, 30 fps<br>1920 × 1080p @ 120, 60, 30 fps<br>[PAL]<br>4 K @ 50, 25, 24 fps<br>2.7 K @ 50, 25, 24 fps<br>1920 × 1080p @ 100, 50, 25, 24 fps |
| | Photo ratio | 16:9/4:3/1:1 |
| | Photo file format | JPEG, RAW |
| | Video file format | MOV, MP4 |
| | Angle of view | 133.9 degrees |
| | Supported SD card | microSD card<br>(a maximum of 512 GB) |
| | Audio output | 48 KHz AAC |

The driving unit 220 may rotate (tilting, panning, and rolling) the camera included in the photographing unit 210. An example of gimbal axes of the driving unit 220 for the tilting, panning, and rolling of the photographing unit 210 may be used as in Table 2, but the present disclosure is not limited thereto. For example, pan, tilt, and roll angles of the gimbal axes may be greater than or smaller than the ranges in Table 2. As a more detailed example, a panning operation range may be set to [−55°~+255°].

TABLE 2

| | | |
|---|---|---|
| Gimbal axes | Pan | [−50° ~ + 250°]/(300° applied) |
| | Tilt | [−50° ~+ 130°]/(180° applied) |
| | Roll | [−120° ~ + 120°]/(240° applied) |

The I/O unit 230 may include a display for outputting an image that is captured and/or generated through the photographing unit 210. Furthermore, the I/O unit 230 may output, through the display, an image stored in a repository. In this case, the repository may correspond to the repository included in the photographing unit 210 and/or a separate repository which may be included in the target tracking apparatus 200, as already described above. The I/O unit 230 may be implemented by using a liquid crystal display (LCD) as in Table 3, but the type or size of the display is not limited thereto.

TABLE 3

| | | |
|---|---|---|
| LCD | Screen size | 2 inches |
| | Picture quality | 480 × 360 |

Furthermore, the I/O unit 230 may further include a component for receiving an input from a user. For example, the display included in the I/O unit 230 may be implemented in the form of a touch screen. Furthermore, the I/O unit 230 may include at least one button and/or a Joystick.

The controller 240 may control operations of the photographing unit 210, the driving unit 220, and the I/O unit 230. The controller 240 may include the processor 120, for example, and may control operations of the photographing unit 210, the driving unit 220, and the I/O unit 230 under the control of a computer program that is stored in the memory 110 and/or in response to an input from a user, which is received through the I/O unit 230.

The power supply unit 250 may supply power to the photographing unit 210, the driving unit 220, the I/O unit 230, and the controller 240. The power supply unit 250 may include a battery illustrated in Table 4, but the present disclosure is not limited thereto. For example, the hardware specifications of the battery included in the power supply unit 250 may be changed, or power may be supplied through a wired connection.

TABLE 4

| | | |
|---|---|---|
| Battery | Type | Lithium ion |
| | Capacity | 2,000 mAh |
| | Voltage | 3.7 V |

The target tracking apparatus 200 may recognize a face of a person in an image that is captured through the photographing unit 210, and may register the recognized face. In this case, a face ID may be assigned to the face of the registered person. In this case, the target tracking apparatus 200 may divide, into a registered face and an unregistered face, the face of the person that appears in the image that is captured through the photographing unit 210, and may display the face of the person on the display included in the I/O unit 230. For example, the target tracking apparatus 200 may provide a user interface in which a user may register an unregistered face by indicating a number in a registered face and indicating a sign "+" in an unregistered face.

In some embodiments, the target tracking apparatus 200 may further include a communication unit (not illustrated). The communication unit may be used for communication with another apparatus and may be WiFi, but the present disclosure is not limited thereto. For example, another wireless communication, such as Bluetooth or 5G, may be used for communication with another apparatus.

Figure 3:
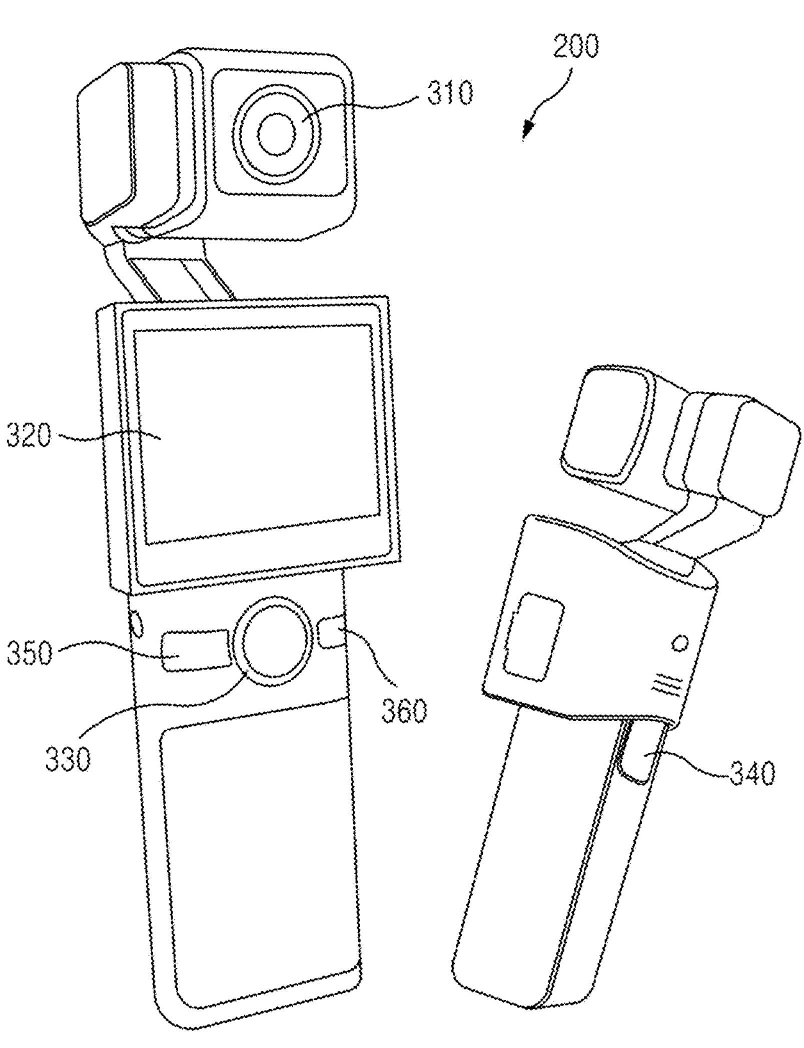
FIGS. 3 and 4 are diagrams illustrating examples of implementations of the target tracking apparatus according to an embodiment of the present disclosure.
Figure 4:
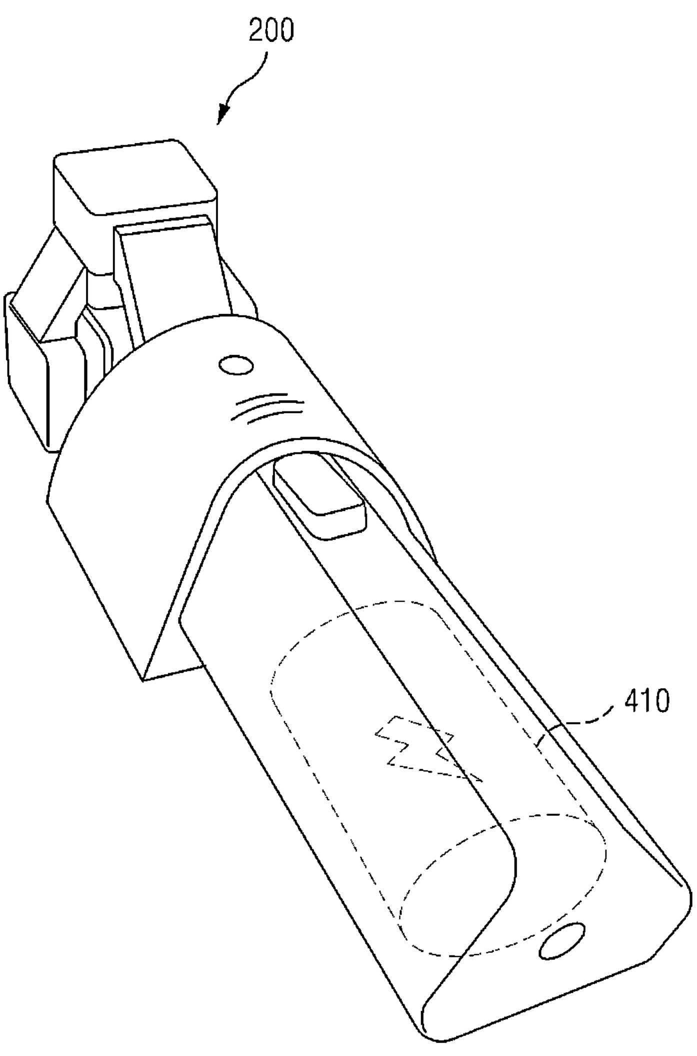

FIGS. 3 and 4 are diagrams illustrating examples of implementations of the target tracking apparatus according to an embodiment of the present disclosure.

As illustrated in FIG. 3, the target tracking apparatus 200 may include a camera 310, a display 320, a jog 330, a trigger 340, and two buttons 350 and 360. The camera 310 may be included in the photographing unit 210 that has been described with reference to FIG. 2. The display 320 is the display included in the I/O unit 230, and may be a touch screen. In the specifications of physical keys, such as the jog 330, the trigger 340, and the two buttons 350 and 360, the functions of the physical keys may be defined as in Table 5, for example, but the present disclosure is not limited thereto. In Table 5, R may correspond to a first button 350, and M may correspond to a second button 360.

TABLE 5

| | Power off | | Preview screen | | During recording | | Enter menu |
|---|---|---|---|---|---|---|---|
| Classification | Short Key | Long Key | Short Key | Long Key | Short Key | Long Key | Short Key |
| R | | | Photographing start | Operation only in photo mode. Start photographing of consecutive picture mode | photographing end | | |
| M | power On | | Switch to photo, video mode | Power off | | Power off after end of photographing | Move to preview screen |
| Jog | | | Move of four directions of gimbal according to jog up, down, left, and right manipulations | | | | |
| Trigger hold | | | Operation of setting gimbal mode according to trigger gimbal control setting Five trigger gimbal control modes 1. Pan 2. Fallow 3. FPV 4. Lock *Default 5. None | | | | |
| Trigger twice | | | Return to center of camera | | Return to center of camera | | |
| Trigger three times | | | Camera selfie/ front mode change | | Camera selfie/front mode change | | |
| Trigger + R | | | | | During recording still photo photographing | | |
| Trigger + M | | | Upon photo mode: change in detailed mode in order of common photo → panorama (consecutive pictures and HDR photo capturing) Upon video mode: change in detailed mode in order of common video → slow motion → hyper lapse → time lapse mode is subjected to loop change. | | | | |
| Trigger + jog↑ | | | Zoom In | | | | |
| trigger + jog↓ | | | Zoom Out | | | | |
| Trigger + jog← | | | | | | | |
| Trigger + jog→ | | | | | | | |

Furthermore, as illustrated in FIG. 4, the target tracking apparatus 200 may include a battery 410 therein. In this case, the battery 410 may be included in the power supply unit 250 that has been described with reference to FIG. 2.

Figure 5:
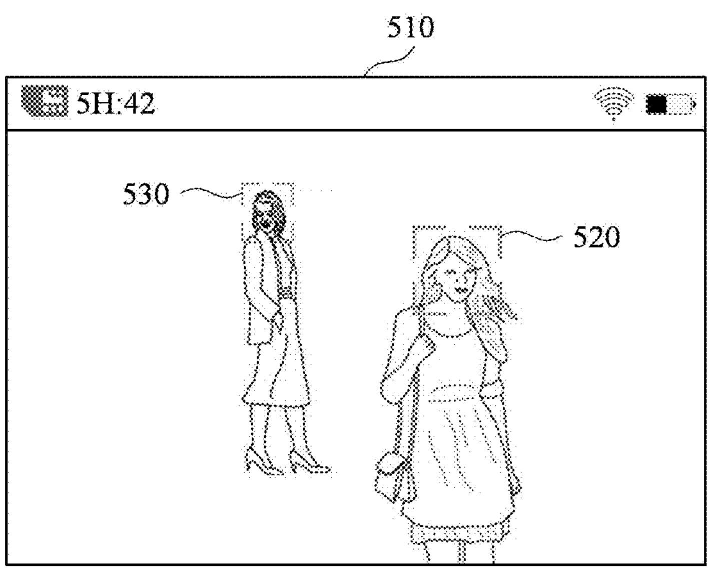
FIGS. 5 and 6 are diagrams illustrating examples of a face tracking mode according to an embodiment of the present disclosure.
Figure 6:
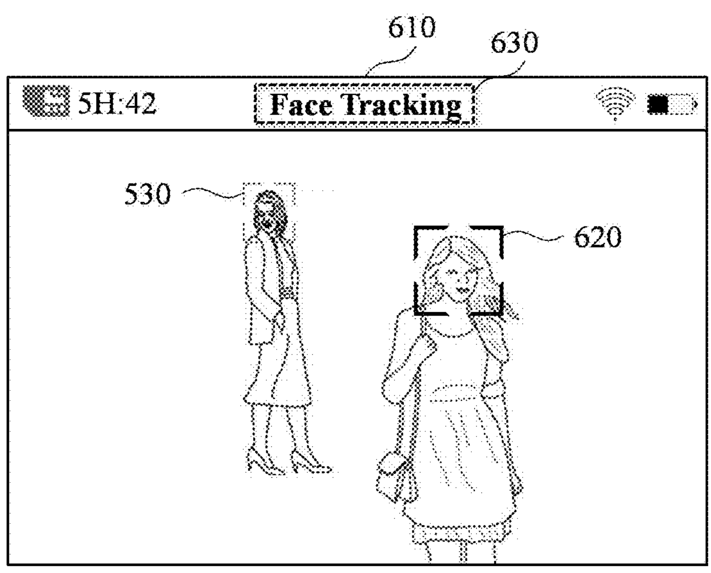

FIGS. 5 and 6 are diagrams illustrating examples of a face tracking mode according to an embodiment of the present disclosure.

When the face tracking mode operates, a face detection function may always operate. For example, when an image is captured by the camera 310 of the photographing unit 210, the controller 240 of the target tracking apparatus 200 may recognize a face of a person in the captured image, and may indicate a mark at a location at which the face of the person has been recognized. For example, FIG. 5 illustrates a first screen 510 on which an image that is captured by the camera 310 has been displayed on the display 320 of the I/O unit 230, and illustrates an example in which a first mark 520 and a second mark 530 are indicated at locations at which faces of persons have been recognized. In this case, when a user selects the first mark 520 and/or the second mark 530 (e.g., taps with a finger on an area in which the first mark 520 and/or the second mark 530 has been indicated in a touch screen environment), a face of a person corresponding to the selected mark may be selected as a tracking target.

FIG. 6 illustrates a second screen 610 that has been changed when the user selects the first mark 520 in the first screen 510. In this case, the first mark 520 may be changed in a way to be different from the first mark 520 and the second mark 530, like a third mark 620. A face of a person corresponding to the third mark 620 may be selected as a tracking target. For example, a mark for a face of a person not a tracking target may be indicated as a white square box, and a mark for a face of a person that is selected as a tracking target may be indicated as a red square box. This is merely an example, and any method capable of differently indicating a mark for a face of a person not a tracking target and a mark for a face of a person that is selected as a tracking target may be used with limitation. When the tracking target is selected, the target tracking apparatus 200 may track the tracking target so that the tracking target is included in an image captured by the camera 310 while rotating the camera 310 of the photographing unit 210, by controlling the driving unit 220 through the controller 240. As the face tracking mode is activated, information indicating that the face tracking mode has been activated may be displayed on the second screen 610, like "Face Tracking" in a dotted box 630. In this case, in some embodiments, the display of the information that is displayed in the dotted box 630 may be released after a given time (e.g., 1.5 second).

Figure 7:
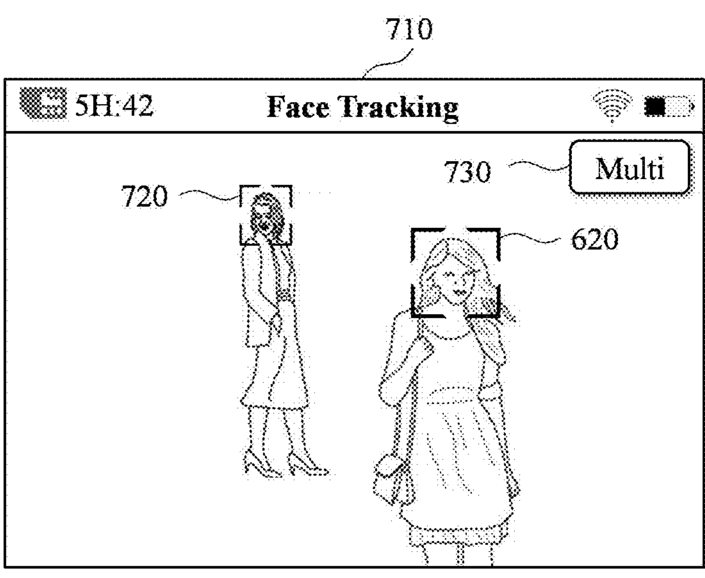
FIG. 7 is a diagram illustrating an example of a multi-tracking mode according to an embodiment of the present disclosure.

FIG. 7 is a diagram illustrating an example of a multi-tracking mode according to an embodiment of the present disclosure. FIG. 7 illustrates a third screen 710 that has been changed as the user selects the second mark 530 in the second screen 610. In this case, the second mark 530 may be changed in a way to be different from the first mark 520 and the second mark 530, like a fourth mark 720. Faces of persons corresponding to the third mark 620 and the fourth mark 720 may be selected as a multi-tracking target. In other words, the face tracking mode may be changed into the multi-tracking mode. In this case, the target tracking apparatus 200 may track the tracking targets so that all of a plurality of tracking targets are included in an image that is captured by the camera 310 while rotating the camera 310 of the photographing unit 210, by controlling the driving unit 220 through the controller 240. The multi-tracking target may include three or more tracking targets. Furthermore, as in the third screen 710, a multi-button 730 may be displayed on the third screen 710. The multi-button 730 may be used to indicate that the multi-tracking mode is in progress, and may be used to terminate the multi-tracking mode.

Figure 8:
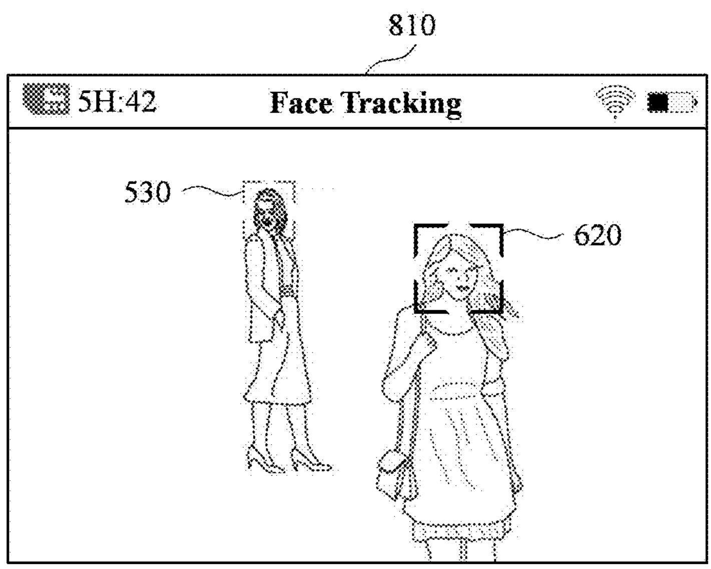
FIGS. 8 and 9 are diagrams illustrating examples in which the multi-tracking mode is terminated in an embodiment of the present disclosure.
Figure 9:
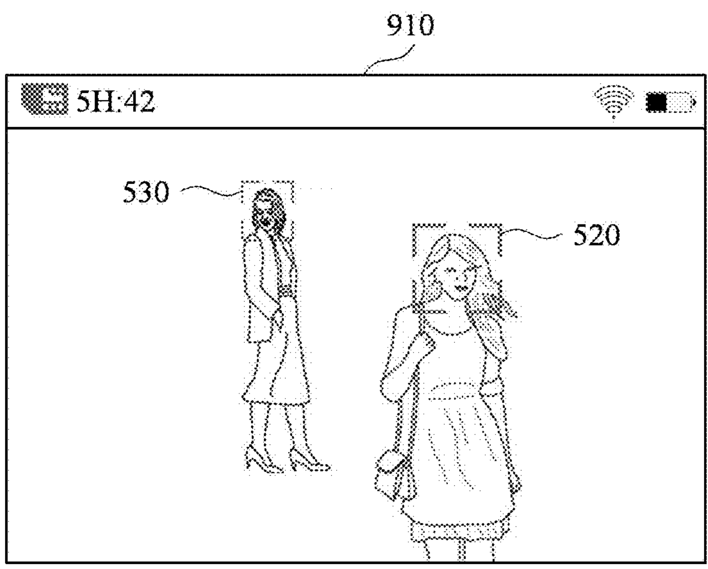

FIGS. 8 and 9 are diagrams illustrating examples in which the multi-tracking mode is terminated in an embodiment of the present disclosure.

FIG. 8 illustrates a fourth screen 810 that has been changed as the user selects the fourth mark 720 in the third screen 710. In this case, a face of a person for the fourth mark 720 may return to the existing second mark 530 again because the face of the person is excluded from the tracking target, and the multi-tracking mode may be terminated as the indication of the multi-button 730 is removed. In other words, the multi-tracking mode may be changed into the face tracking mode again. If three or more multi-tracking targets are present, the multi-tracking targets may be maintained although one target is excluded from the multi-tracking targets.

FIG. 9 illustrates a fifth screen 910 that has been changed as the user selects the multi-button 730 in the third screen 710. In this case, as all targets are excluded from the tracking targets at once, the multi-tracking mode may be terminated. Furthermore, FIG. 9 illustrates that the third mark 620 and the fourth mark 720 indicated on the third screen 710 have been changed into the first mark 520 and the second mark 530, respectively, in the fifth screen 910. This may mean that all targets have been removed from tracking targets.

If the user selects the third mark 620 in the second screen 610 or the fourth screen 810, as the third mark 620 is changed into the first mark 520, a face tracking target may be released. Even in this case, as in the first screen 510, the face detection function may continue to operate and indicate the first mark 520 and the second mark 530.

The target tracking apparatus 200 may track an identified target by identifying a face of a person. In the aforementioned embodiments of FIGS. 5 to 9, only a face of a person is recognized. In contrast, in subsequent embodiments of FIGS. 10 to 13, an example in which a face of a person is recognized, a registered person is identified, and an identified target is tracked is described.

FIGS. 10 to 13 are diagrams illustrating examples in which a face of a person is registered in an embodiment of the present disclosure.

Figure 10:
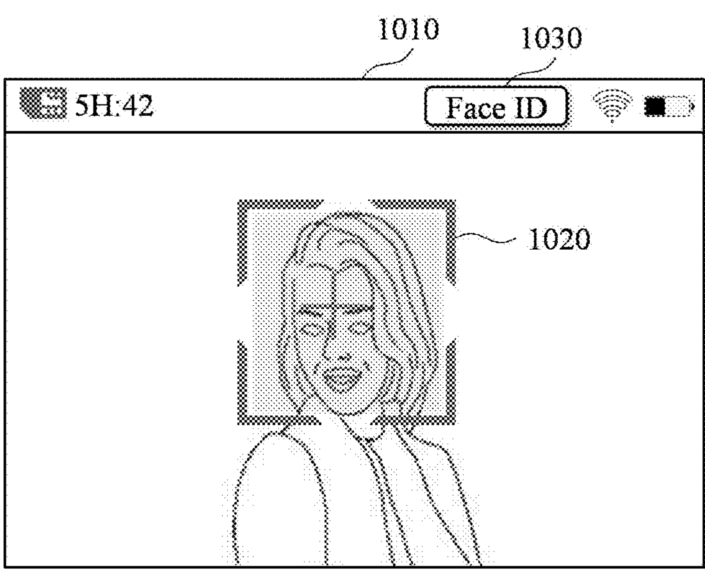
FIGS. 10 to 13 are diagrams illustrating examples in which a face of a person is registered in an embodiment of the present disclosure.

When a face ID mode is activated through a user interface, a function for registering a face of an unregistered person that appears on a screen may be provided to a user. A screen 1010 of FIG. 10 illustrates an example in which a first face registration mark 1020 for registering a face of an unregistered person has been indicated. In this case, when a user selects the first face registration mark 1020 (e.g., taps with a finger on the area of the first face registration mark 1020), the face of the corresponding person may be registered. In the screen 1010 of FIG. 10, "Face ID" 1030 may indicate that the face ID mode is now activated.

Figure 11:
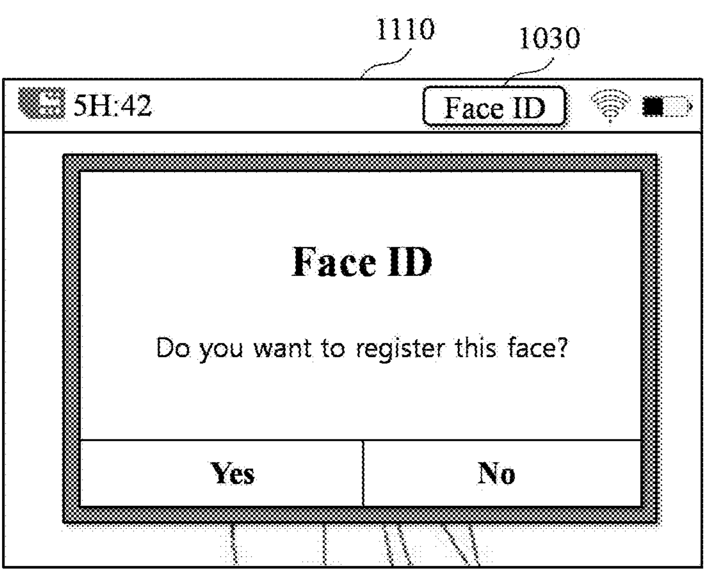
Figure 12:
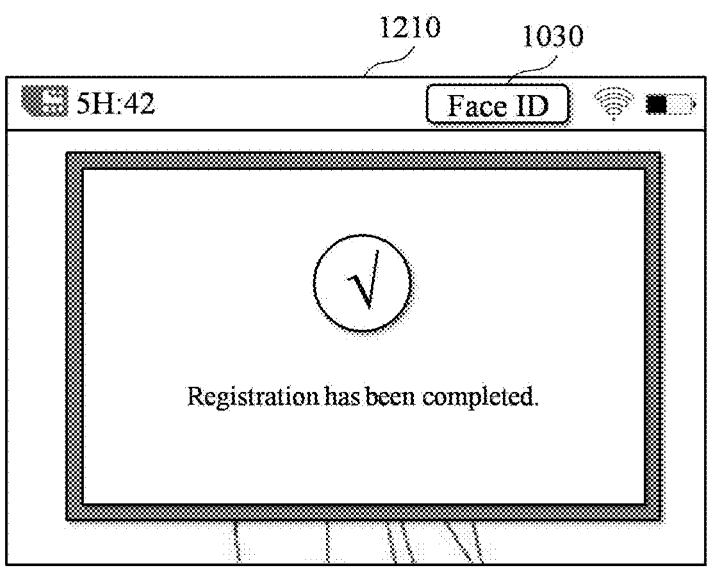

A screen 1110 of FIG. 11 illustrates an example of a user interface that asks a user whether a face indicated by the first face registration mark 1020 will be registered. When the user accepts the ask, the face of the corresponding person may be registered. A screen 1210 of FIG. 12 illustrates that the registration of the face of the corresponding person has been completed.

Figure 13:
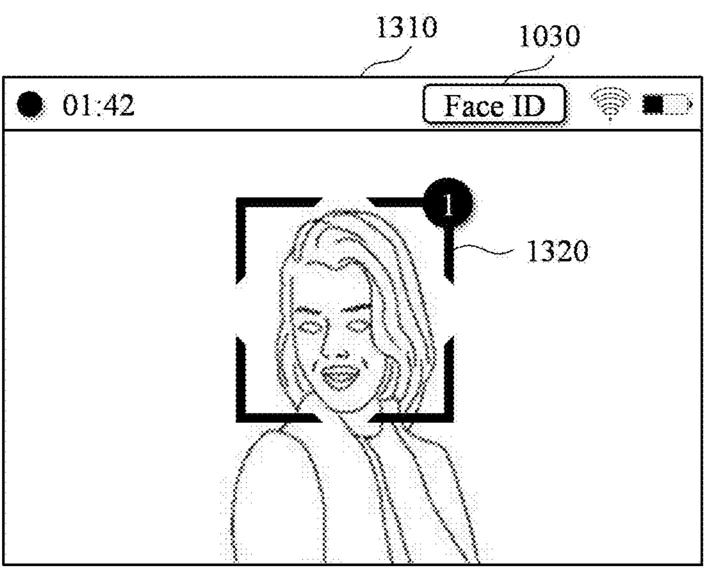

A screen 1310 of FIG. 13 illustrates an example in which as the face of the corresponding person is registered, the face of the registered person is indicated through a first registration face mark 1320. In this case, a number 1 that is indicated in the first registration face mark 1320 may indicate that the face of the corresponding person is a face of a person that has been first registered.

The target tracking apparatus 200 may automatically track a face of a registered person when the face of the registered person appears in the face ID mode.

Figure 14:
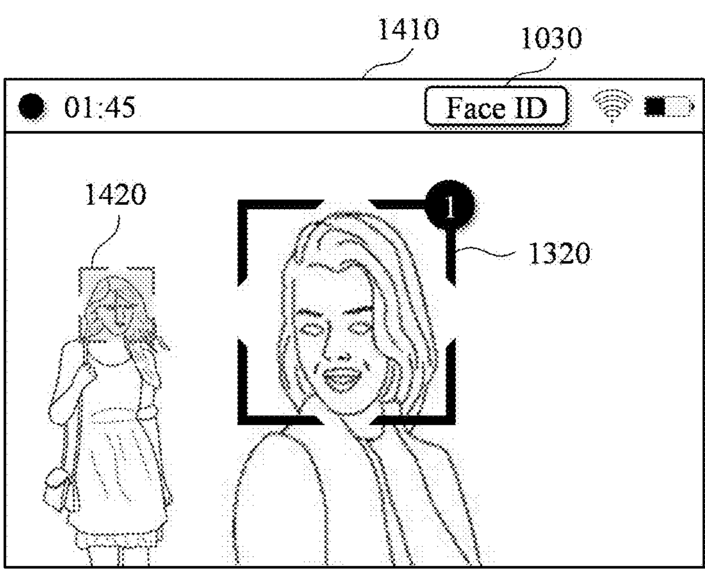
FIGS. 14 and 15 are diagrams illustrating examples in which a plurality of faces is registered in an embodiment of the present disclosure.
Figure 15:
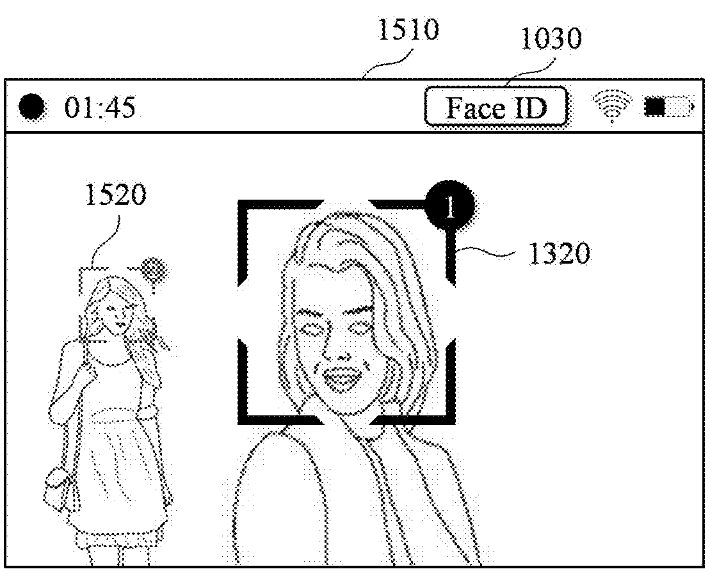

FIGS. 14 and 15 are diagrams illustrating examples in which a plurality of faces is registered in an embodiment of the present disclosure.

A screen 1410 of FIG. 14, illustrates an example in which a new person of an unregistered face appears on a screen 1410 during recording of an image in the screen 1310 of FIG. 13. In this case, as illustrated in the screen 1410 of FIG. 14, a second face registration mark 1420 may be indicated in the face of the new person. The user may register the face of the corresponding person by selecting the second face registration mark 1420. In some embodiments, three or more faces of persons may be registered.

A screen 1510 of FIG. 15, illustrates an example in which the second face registration mark 1420 has been changed into a second registration face mark 1520 as the user registers the face of the corresponding person by selecting the second face registration mark 1420 in the screen 1410 of FIG. 14. In this case, a number 2 that appears in the second registration face mark 1520 may indicate that the face of the corresponding person is a face of a person that has been second registered.

The target tracking apparatus 200 may track one target having high registration priority when faces of two or more registered persons appear on a screen in the face ID mode. For example, in the embodiment of FIG. 15, the face of the person (i.e., a priority No. 1 target) that has been first registered and that corresponds to the number 1 may be tracked. In this case, the second registration face mark 1520 that is indicated in the face of the person (i.e., a priority No. 2 target) that corresponds to the number 2 may be indicated in a way to be differentiated from the first registration face mark 1320. In this case, the differentiation may mean that a color, a shape, etc. of the second registration face mark 1520 are differently indicated. However, even though the priority No. 1 target is recognized while a priority No. 3 target is tracked, the target tracking apparatus 200 may continue to track the priority No. 3 target. In this case, the user may change a tracking target by selecting (e.g., a double-tapping on) a registration face mark for the priority No. 1 target.

Figure 16:
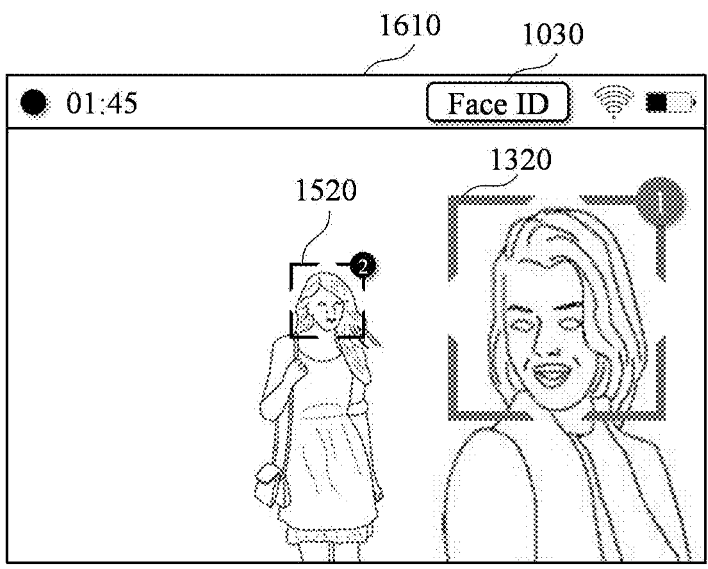
FIG. 16 is a diagram illustrating an example in which a tracking target is changed in a face ID mode in an embodiment of the present disclosure.

FIG. 16 is a diagram illustrating an example in which a tracking target is changed in the face ID mode in an embodiment of the present disclosure. A screen 1610 of FIG. 16 illustrates an example in which a tracking target has changed from the priority No. 1 target to the priority No. 2 target as the user selects the second registration face mark 1520 in the screen 1510 of FIG. 15. In this case, as the tracking target is changed, the target tracking apparatus 200 may rotate the camera 310 through the driving unit 220 under the control of the controller 240 in order to track the priority No. 2 target.

Figure 17:
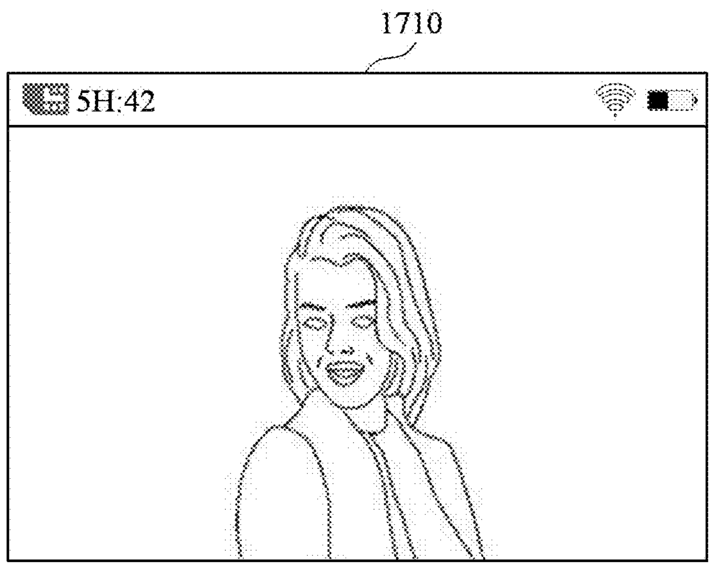
FIGS. 17 and 18 are diagrams illustrating examples in which the face ID mode is terminated in an embodiment of the present disclosure.
Figure 18:
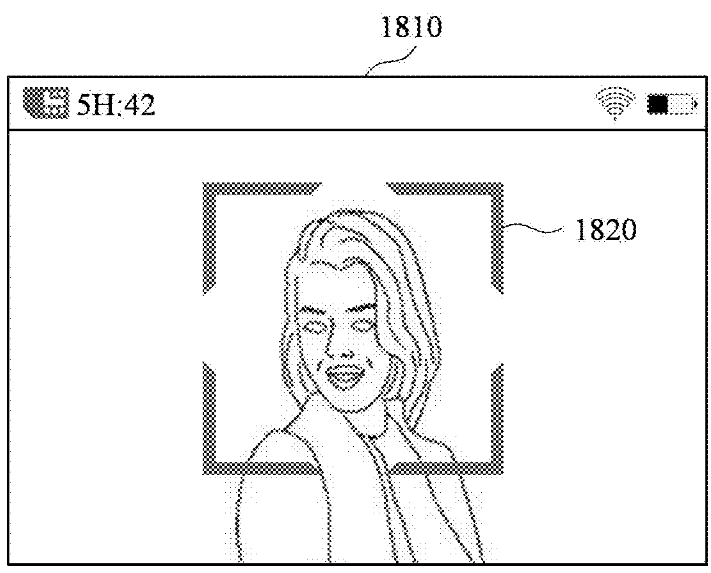

FIGS. 17 and 18 are diagrams illustrating examples in which the face ID mode is terminated in an embodiment of the present disclosure.

FIG. 17 illustrates a screen 1710 when the user terminates the face ID mode by selecting (e.g., tapping on) the first registration face mark 1320 or selecting "Face ID" 1030 in the screen 1310 of FIG. 13. In this case, the indication of "Face ID" 1030 and the indication of the first registration face mark 1320 may be removed.

FIG. 18 illustrates a screen 1810 when the user terminates the face ID mode by selecting (e.g., tapping on) the first registration face mark 1320 or selecting "Face ID" 1030 in the screen 1310 of FIG. 13 and an AI tracking mode is activated. In this case, the indication of "Face ID" 1030 may be removed, and the first registration face mark 1320 may be changed into an AI tracking mark 1820. The AI tracking mode is more specifically described later.

Figure 19:
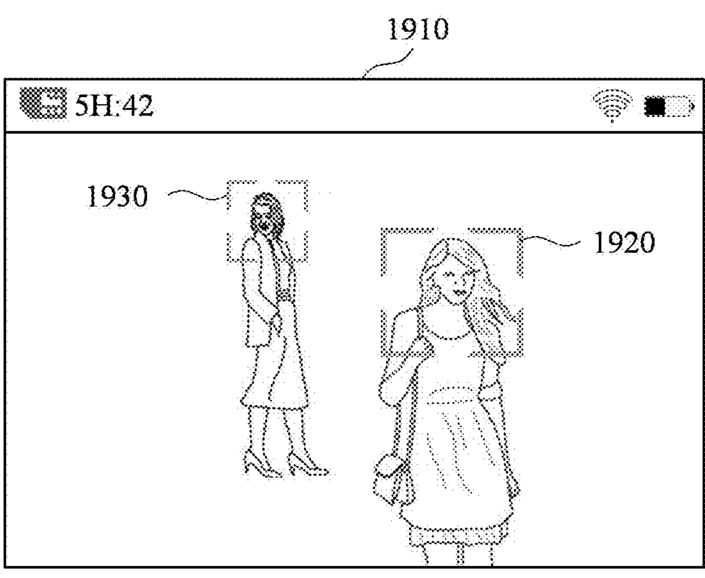
FIGS. 19 and 20 are diagrams illustrating examples of an AI tracking mode in an embodiment of the present disclosure.
Figure 20:
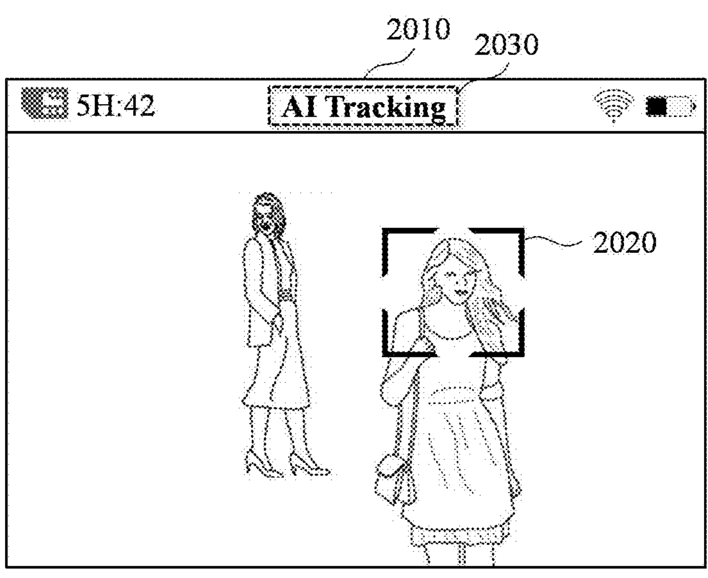

FIGS. 19 and 20 are diagrams illustrating examples of the AI tracking mode in an embodiment of the present disclosure.

In the AI tracking mode, a plurality of recognition engines may be used. One of the plurality of recognition engines may be a face recognition engine, and the other of the plurality of recognition engines may be an object recognition engine. In a preview state, the face detection function may always operate through the face recognition engine. When a face is recognized, the recognized face may be indicated. For example, a white square rim may be indicated, but the present disclosure is not limited thereto. In this case, an indicated mark may indicate even a shoulder area of a person that corresponds to the recognized face, in addition to the recognized face. In this case, when a mark for a specific face is selected, AI tracking may operate. In this case, the face recognition engine may be stopped, and the object recognition engine may operate and track an object that corresponds to the specific face. Accordingly, although a person in a screen turns his or her face and the face of the person is not seen or another face is present in the screen, the target tracking apparatus 200 may continue to track the corresponding object.

A screen 1910 of FIG. 19 illustrates an example in which a first mark 1920 and a second mark 1930 are indicated up to shoulder areas of recognized faces. The reason why the first and second marks 1920 and 1930 are indicated even up to the shoulder areas in addition to the faces is for subsequently tracking a target through the object recognition engine not the face recognition engine.

A screen 2010 of FIG. 20 illustrates an example in which an object indicated by a third mark 2020 is tracked as the first mark 1920 is changed into the third mark 2020 when the user selects (e.g., taps on) the first mark 1920 in the screen 1910 of FIG. 19. In this case, as already described above, an object that has already been designated is tracked through the object recognition engine not the face recognition engine. Although a person in a screen turns his or her face and the face of the person is not seen or another face is present on the screen, the target tracking apparatus 200 may continuously track the corresponding object. The indication of a mark "AI Tracking" 2030 for AI tracking may be released after a given time (e.g., 1.5) elapses since AI tracking is started.

When the user selects (e.g., taps on) the third mark 2020 in the screen 2010 of FIG. 20, the AI tracking may be released, and the screen 2010 of FIG. 20 may be changed into the screen 1910 of FIG. 19. Such AI tracking may support both a front mode and a selfie mode.

Figure 21:
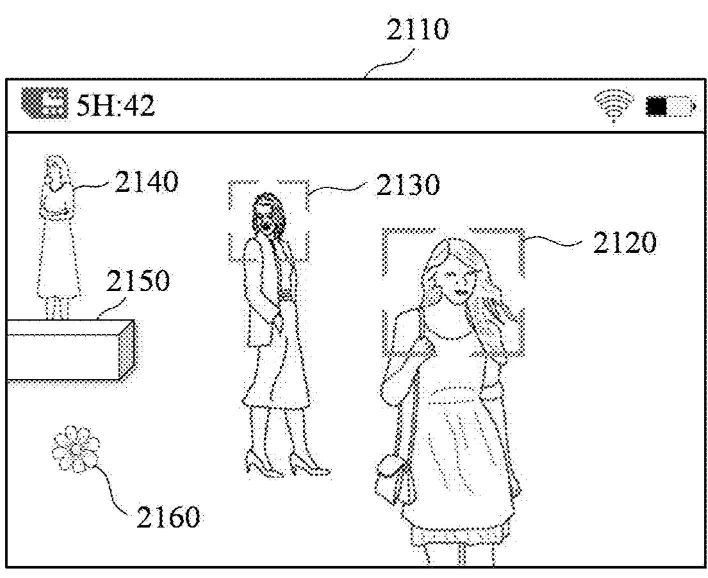
FIGS. 21 and 22 are diagrams illustrating examples of an active tracking mode according to an embodiment of the present disclosure.
Figure 22:
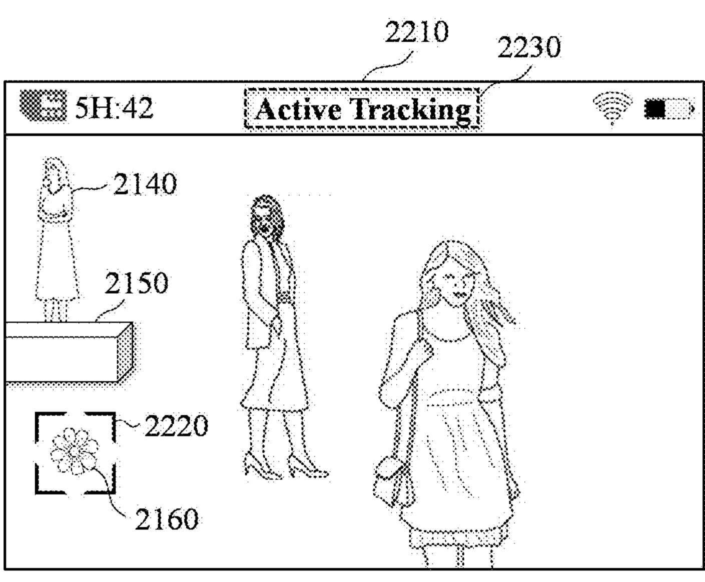

FIGS. 21 and 22 are diagrams illustrating examples of an active tracking mode according to an embodiment of the present disclosure.

A screen 2110 of FIG. 21 illustrates an example in which a first mark 2120 and a second mark 2130 have been indicated up to shoulder areas of recognized faces. As already described above, the reason why the marks 1920 and 1930 are indicated up to the shoulder areas in addition to the faces is for tracking a target through the object recognition engine not the face recognition engine when the AI tracking mode is activated. Furthermore, the screen 2110 of FIG. 21 further illustrates a target 2140 whose face recognition has failed and things 2150 and 2160.

In this case, the user may activate the active tracking mode by selecting the target 2140 whose face recognition has failed or the first thing 2150 or the second thing 2160 (e.g., double-tapping an area in which the second thing 2160 has been indicated).

A screen 2210 of FIG. 22 illustrates an example in which the active tracking mode has been activated as the user selects the second thing 2160 in the screen 2110 of FIG. 21. In this case, the target tracking apparatus 200 may track the second thing 2160 through the recognition of an object for the second thing 2160 that has been selected by the user, by stopping the face recognition engine and operating the object recognition engine. The screen 2210 of FIG. 22 illustrates an example in which a mark 2220 for the second thing 2160 has been set. As the active tracking mode is activated, information indicating that the active tracking mode has been activated may be displayed on the screen 2210 like "Active Tracking" in a dotted box 2230. In this case, in some embodiments, the indication of the information that is indicated in the dotted box 2230 may be released after a given time (e.g., 1.5 second).

Figure 23:
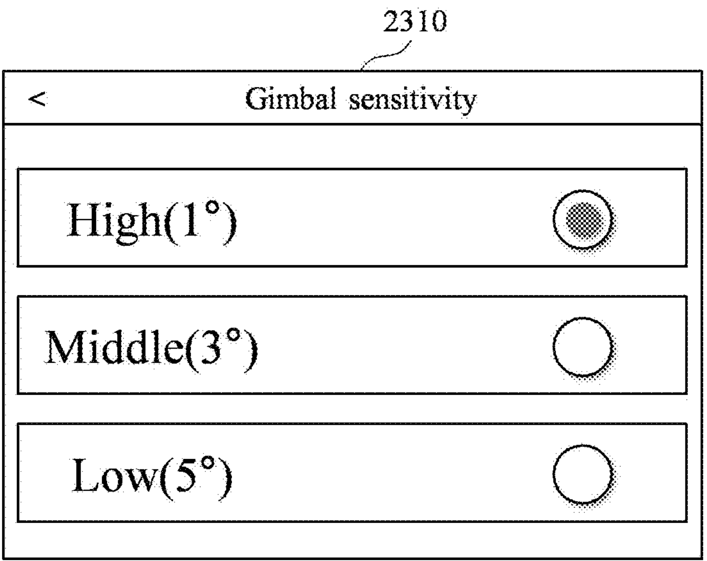
FIG. 23 is a diagram illustrating an example in which gimbal sensitivity is set in an embodiment of the present disclosure.

In some embodiments, the target tracking apparatus 200 may set gimbal sensitivity. FIG. 23 is a diagram illustrating an example in which gimbal sensitivity is set in an embodiment of the present disclosure. A setting screen 2310 of FIG. 23 illustrates an example in which the gimbal sensitivity is set as one of three stages of High (1°), Middle (3°), and Low (5°). In this case, "High" may mean that the target tracking apparatus 200 tracks a tracking target so that the tracking target is displayed at the center of a screen by rotating the camera 310 whenever the tracking target deviates from the center of the screen by 1°. Likewise, "Middle" may mean that the target tracking apparatus 200 tracks a tracking target so that the tracking target is displayed at the center of a screen by rotating the camera 310 whenever the tracking target deviates from the center of the screen by 3°. "Low" may mean that the target tracking apparatus 200 tracks a tracking target so that the tracking target is displayed at the center of a screen by rotating the camera 310 whenever the tracking target deviates from the center of the screen by 5°. For example, when the gimbal sensitivity is set as "Low", if a tracking target deviates from the center of a screen by less than 5°, the target tracking apparatus 200 may wait without rotating the camera 310. It may be easily understood that the number of stages of gimbal sensitivity or the size of an angle for each stage may be variously defined in some embodiments.

In some embodiments, the target tracking apparatus 200 may photograph and/or record an image along a path based on two or more points. For example, if points A, B, C, and D are set, the target tracking apparatus 200 may rotate the camera 310 of the photographing unit 210 through the driving unit 220 so that an image is photographed and/or recorded in order of A→B→C→D. Furthermore, in some embodiments, the target tracking apparatus 200 may repeatedly photograph and/or record an image along a path according to two or more points. For example, if points A and B are set, the target tracking apparatus 200 may continuously and repeatedly photograph and/or record an image in order of "A→B→A→B . . . ."

FIGS. 24 to 29 are diagrams illustrating examples in which a path is designated in an embodiment of the present disclosure.

Figure 24:
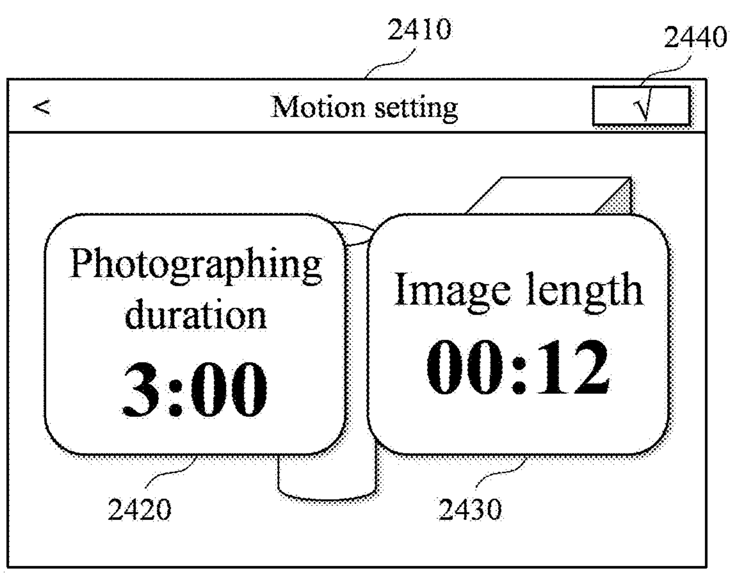
FIGS. 24 to 29 are diagrams illustrating examples in which a path is designated in an embodiment of the present disclosure.

A screen 2410 of FIG. 24 illustrates an example of a screen for motion setting. In this case, the motion setting screen illustrates an example in which a photographing duration indication area 2420 and an image length indication area 2430 are indicated. First, when duration for which an image will be photographed is set, the length of the image may be automatically and indicated based on each video setting value (e.g., a double-speed and/or an interval). For example, a user may set photographing duration by selecting the photographing duration indication area 2420. When the user selects a confirm button 2440, motion photographing may be performed.

Figure 25:
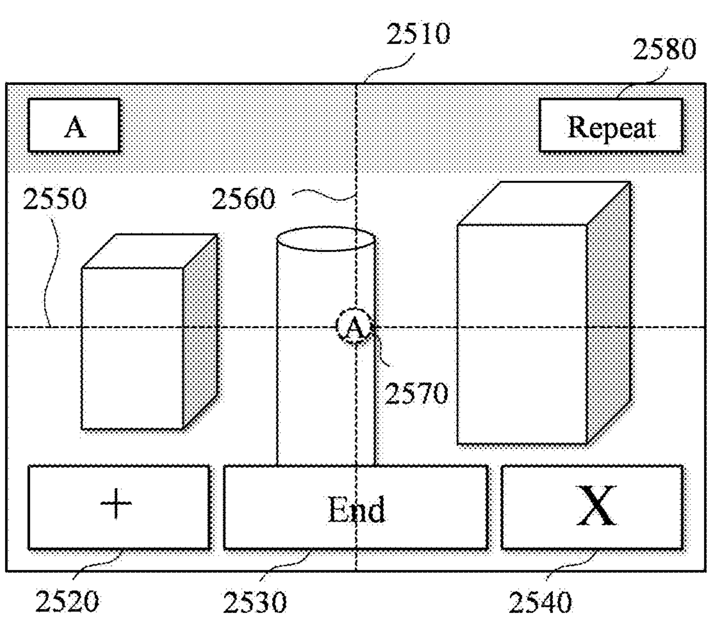
Figure 26:
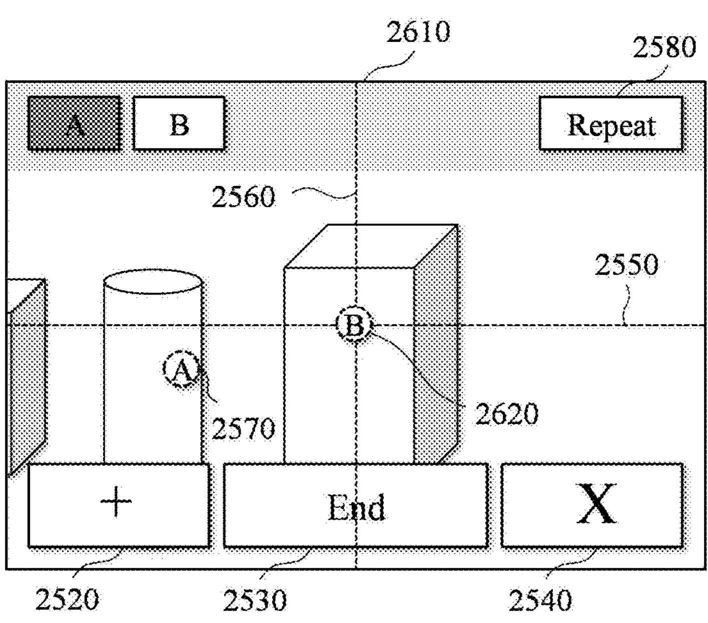

A screen 2510 of FIG. 25 illustrates an example in which a location at a central portion of a current screen has been set as a first point "A". A screen 2610 of FIG. 26 illustrates an example in which the location at the central portion of the current screen has been set as a second point "B". For example, a user may set the point "A" by pressing a confirm button (e.g., any one that has been pre-defined among the trigger 340 and the two buttons 350 and 360 that have been described with reference to FIG. 3) at the location of the point "A", may move the direction of the camera 310 to the point "B" (i.e., move the direction of the camera 310 by rotating the camera 310), and may then set the point "B" by pressing the confirm button again by using a jog (e.g., the jog 330 that has been described with reference to FIG. 3). In this case, the point "B" may correspond to the location of a central portion in the screen 2610 of FIG. 26. Furthermore, for example, the user may set the point by pressing a "+" button 2520 in the screens 2510 and 2610. An end button 2530 may be a user interface for terminating a motion photographing function using a path. An "X" button 2540 may be a user interface for releasing the setting of a set point. The repetition button 2580 is more specifically described later.

In the screens 2510 and 2610, two dotted lines 2550 and 2560 and dotted circles 2570 and 2620 indicative of the points have been indicated in the drawings in order to help understanding of the disclosure, and may not be indicated in an actual screen.

When the point "A" and the point "B" are set, the target tracking apparatus 200 may record an image while moving the direction of the camera 310 from the point "A" to the point "B" during set photographing duration.

Figure 27:
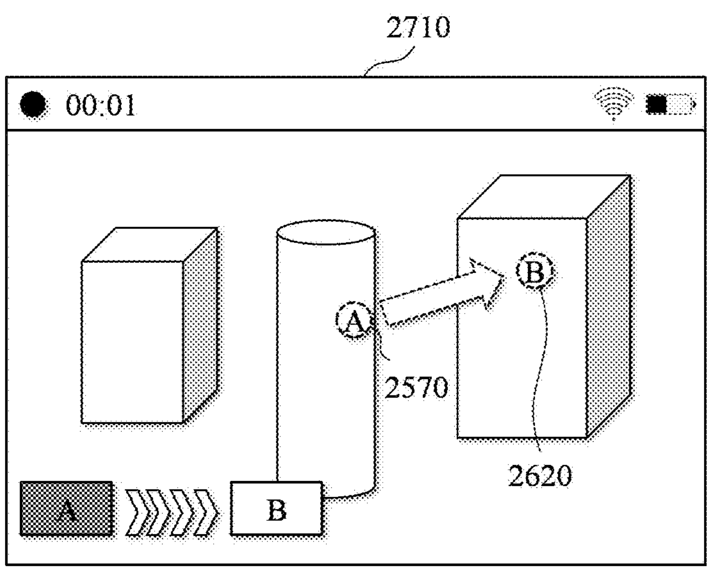
Figure 28:
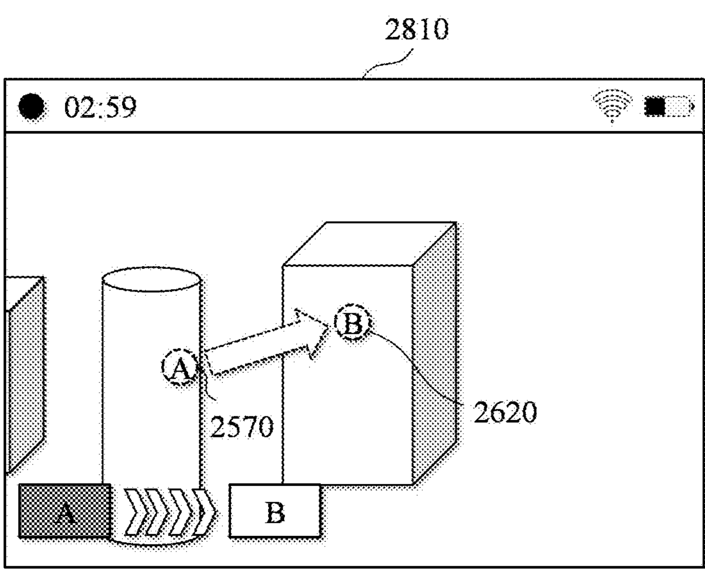

A screen 2710 of FIG. 27 illustrates an example in which recording according to motion photographing from the point "A" to the point "B" has started. A screen 2810 of FIG. 28 illustrates an example in which the point "A" has moved to the location of the point "B" based on three minutes, that is, preset photographing duration. The target tracking apparatus 200 may calculate a movement distance between the point "A" and the point "B", may calculate a movement angle based on the movement distance, and may then calculate a rotation angle of the camera 310 during unit time based on the movement angle and the photographing duration. Accordingly, the target tracking apparatus 200 may complete the motion photographing from the point "A" to the point "B" during the photographing duration by rotating the camera 310 by the calculated rotation angle every unit time.

Figure 29:
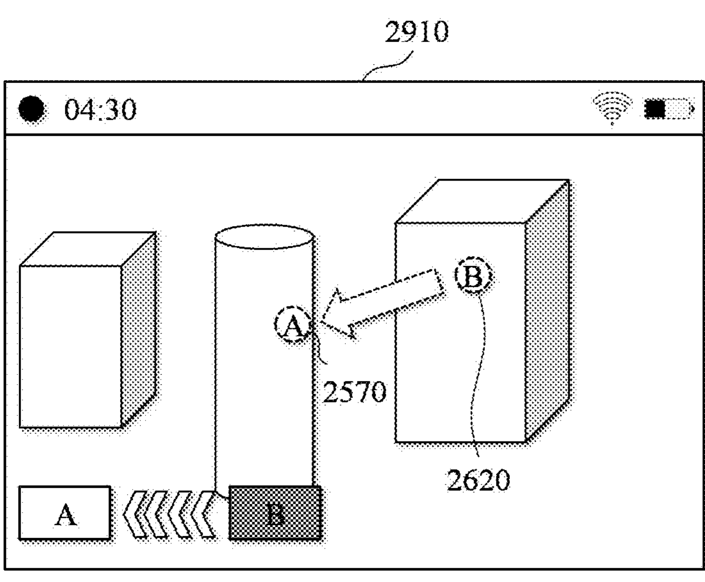

Furthermore, a user may repeatedly record a section image between the point "A" and the point "B" by using a user interface, such as a repetition button 2580. In this case, the target tracking apparatus 200 may record the section image between the point "A" and the point "B" by infinitely repeating the section between the point "A" and the point "B" or repeating the section between the point "A" and the point "B" by the number of repetitions that has been set by the user. A screen 2910 of FIG. 29 illustrates an example in which after the motion photographing has moved from the point "A" to the point "B", the motion photographing is moving from the point "B" to the point "A" again.

In another embodiment, the target tracking apparatus 200 may set three or more points, and may perform motion photographing on a path that has been set by the three or more points.

Figure 30:
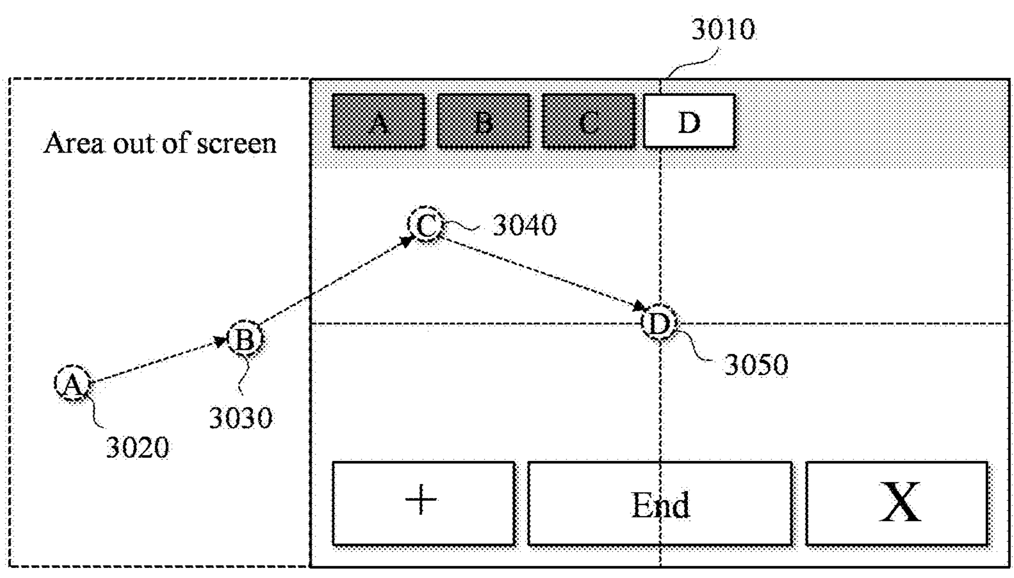
FIGS. 30 and 31 are diagrams illustrating examples of motion photographing for four points in an embodiment of the present disclosure.
Figure 31:
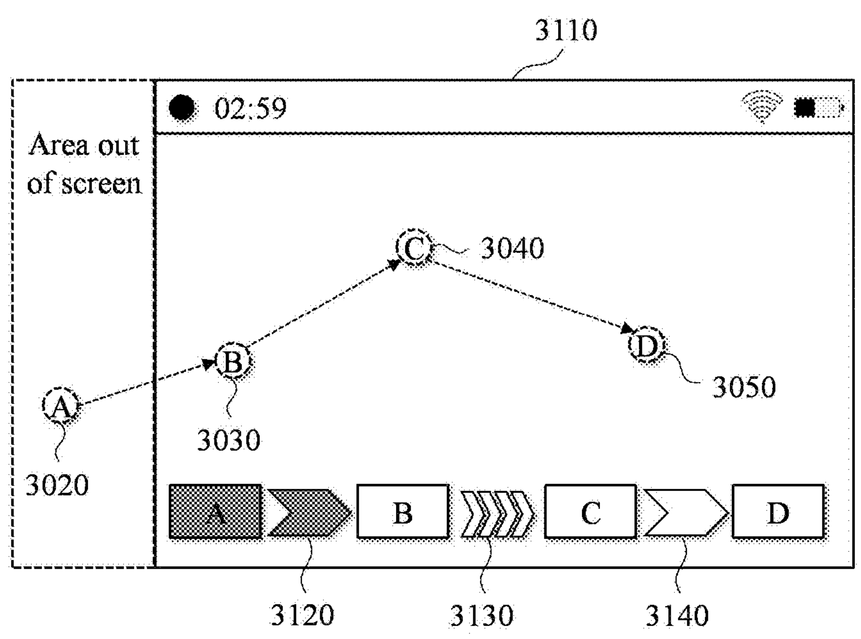

FIGS. 30 and 31 are diagrams illustrating examples of motion photographing for four points in an embodiment of the present disclosure.

A screen 3010 of FIG. 30 illustrates an example in which a user has set four points of a point "A" 3020, a point "B" 3030, a point "C" 3040, and a point "D" 3050. In this case, it is assumed that the point "A" 3020 and the point "B" 3030 are present in an area out of the screen. In this case, the target tracking apparatus 200 may control the camera 310 to record an image while moving the direction of the camera 310 along a path according to the section of the four points, that is, the point "A" 3020, the point "B" 3030, the point "C" 3040, and the point "D" 3050. A screen 3110 of FIG. 31 illustrates an example in which the target tracking apparatus 200 moves while rotating the camera 310 from the point "A" 3020 toward the point "D" 3050 via the point "B" 3030 and the point "C" 3040. In this case, a first mark 3120 may mean a path along which the target tracking apparatus 200 has already moved. A second mark 3130 may mean a path along which the target tracking apparatus 200 is moving. A third mark 3140 may mean a path into which the target tracking apparatus 200 has not entered. In other words, it can be easily understood that the camera 310 of the target tracking apparatus 200 is currently moved toward the point "C" 3040 via the point "B" 3030.

The dotted circles indicative of the points 3020, 3030, 3040, and 3050 are merely indicated to help understanding of the present disclosure, and may not be actually displayed on the display 320. Alternatively, in order to help understanding of a user who uses the target tracking apparatus 200, marks for the respective points 3020, 3030, 3040, and 3050 may be displayed on the display 320. In this case, the marks for the respective points 3020, 3030, 3040, and 3050 are not limited to the dotted circles.

In still another embodiment, the target tracking apparatus 200 may provide a head tracking mode. The head tracking mode may provide a function for controlling the camera 310 based on a direction of a gaze of a user or the head of a user.

A conventional camera has been used to set a direction in which a user wants to take a photo and to capture an image by pressing a photographing switch (or button). Furthermore, the camera is developed to have a function that enables a user to more conveniently adjust the camera, such as adjusting the photographing of the camera and video start and stop through a smartphone over wired and wireless communication networks. Furthermore, with the emergence of a camera including a gimbal function, the camera is expanded up to a device capable of mechanically suppressing the shaking of the camera and also adjusting the camera so that a camera lens unit can be rotated at various angle. As described above, in order for a user to perform photo capturing or video recording, the conventional camera uses a switch (button) as an input based on a corresponding function, and a device operates in response to a corresponding input signal. Accordingly, a current technology in which the device is moved and a corresponding function operates only when a user directly manually transmits an input signal for a direction in which the camera is intended to perform photo capturing or video recording, and is an example of various cases and shows limitations. For example, an input error may occur in a process of manipulating an input signal several times. Furthermore, various input errors, such as that the switch (button) needs to be physically pressed once, but is pressed twice and that an input signal is not delivered due to a mechanical defect although the switch was pressed, may frequently occur. Furthermore, in moving the camera lens unit or rotating and operating the camera that is fixed to the gimbal apparatus, the same input error may occur, and an input signal needs to be delivered to the device by manually manipulating the switch (button). When a user sets a scene for photo capturing or video recording, the user has to manually fix a corresponding direction. Furthermore, there is a lot of inconvenience, such as that a user has to set the direction of a lens again one by one and fix the direction of the lens if a subject for photographing or the camera device needs to be moved.

Accordingly, if photographing can be performed while moving the camera at a gaze that is seen by a user freely with two hands of the user by using a sensor and Bluetooth or Wi-Fi communication, a photographing mode can be changed based on gaze processing and several situations, and shaking can be corrected, such a technology may become a technology which may be used in significant photographing equipment in many fields, such as personal photographing, broadcasting photographing, and one-person creator.

In the case of a gimbal camera or a camera-assistant accessory product having a gimbal function, a device operates only when a user integrates a direction in which photographing needs to be accurately performed and the direction of the device when the user wants to perform a photo capturing or video recording function, and transmits an input signal to a switch (button) or transmits the input signal by using wired and wireless communication. In this case, an error may occur in a process of pressing the physical switch of the switch (button). There is inconvenience because a user has to move and fix the device again one by one based on a desired direction in order to set the direction of the camera. In particular, when a user performs selfie photographing in the state in which the device has been placed in front of the user, the user has to transmit an input signal to the device so that the direction of the camera is identical with a direction that is desired by the user. Such a behavior includes inconvenience of a user in an environment in which the personal media market is recently expanded because the user has to input a modified input signal whenever the direction of the camera is changed.

Furthermore, there is already a technology in which a screen of a photographed image or content is moved based on a gaze angle of the head of a user through a virtual reality (VR) device. This is a technology for VR content consumption. Most of the existing cameras use a technology in which the cameras are fixed and perform photographing or perform the tracking and photographing of a thing and a specific moving object.

The target tracking apparatus 200 according to the present embodiment can photograph an image while moving the camera 310 based on a gaze that is seen by a photographer or a movement/situation thereof. Upon photographing, a camera, an angle, etc., may be driven in accordance with a gaze of a photographer in real time based on an angle of the head of a person/gaze angle of the person. The photographing function may be changed based on a movement of a photographer or a state of an image. Accordingly, the target tracking apparatus 200 can provide a smart shooting or auto-filming function.

The target tracking apparatus 200 may perform photographing by tracking a location according to a gaze of a photographer, by using a technology for the stabilization of the gimbal and the motor, the movement and measurement of a gyro sensor, movement data communication through wireless communication such as Bluetooth or WiFi, and the calculation of a point of a gaze of a photographer, a sensor, and a distance of the gimbal by determining strength or speed direction of a movement and a photographed location or space.

Accordingly, when a person travels or photographs his or her daily life or in a specific situation, the person can perform photographing while a camera angle is moved by using a high-quality image photographing scheme without shaking or vibration based on his or her gaze.

The target tracking apparatus 200 may rotate the camera 310 based on a movement of a given signal device including the gyro sensor, which is owned by a user, by setting a virtual coordinate system based on a movement of the gyro sensor by using a sensor and Bluetooth or WiFi communication, modeling a motion equation of the gimbal in order to track corresponding target virtual coordinates, and inputting speed instructions for the axis (pan, tilt, and roll) motors of the gimbal to a driving motor. Alternatively, the target tracking apparatus 200 may set target virtual coordinates according to a gaze of a user through image analysis.

If a terminal device (e.g., a head tracker) owned by a user and the target tracking apparatus 200 watch a subject for photographing in the same direction, the camera 310 may be forward rotated in response to a signal according to a movement of the terminal device. Furthermore, if the terminal device owned by the user and the target tracking apparatus 200 face each other, the camera 310 may be rotated in a direction that is opposite to a movement of the terminal device.

Furthermore, the target tracking apparatus 200 may also be equipped with a voice recognition sensor along with the gyro sensor. When a user guides a direction on the basis of a location of the user through a voice, the camera 310 of the target tracking apparatus 200 may be rotated.

To this end, the target tracking apparatus 200 may communicate with a terminal device that is owned by the user. In this case, the terminal device that is owned by the user may be a portable device that is equipped with the gyro sensor and a microphone capable of a voice recognition input. Such a terminal device may be implemented in a form in which the terminal device is worn on an ear or the head of the user for more accurate measurement of the head direction of the user. The gyro sensor is a device capable of measuring an angular speed according to a movement of an object, and can accurately identify an aerial motion because the gyro sensor can accurately measure movement coordinate values of a user regardless of a slope or a surrounding environment. The target tracking apparatus 200 may receive a signal that is detected based on a movement of such a terminal device, and may track the head of a use by controlling the rotation of the camera 310 based on the received signal. Furthermore, for example, when facing a user, the target tracking apparatus 200 may control the rotation of the camera 310 by recognizing target virtual coordinates of a virtual coordinate system according to a gaze of the user that is recognized through the camera 310. Furthermore, for example, the terminal device that is owned by the user may receive, as a voice, an absolute value of a direction and movement location of the user through the microphone included therein, and may transmit the voice to the target tracking apparatus 200. The target tracking apparatus 200 may control the rotation of the camera 310 based on the received information.

Figure 32:
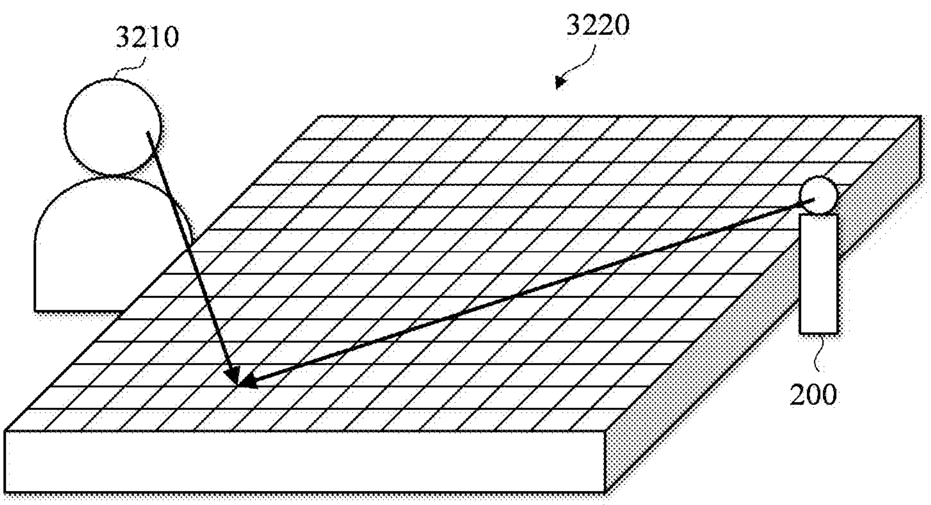
FIGS. 32 to 34 are diagrams illustrating an example of a method of controlling a camera based on a gaze of a user in an embodiment of the present disclosure.
Figure 33:
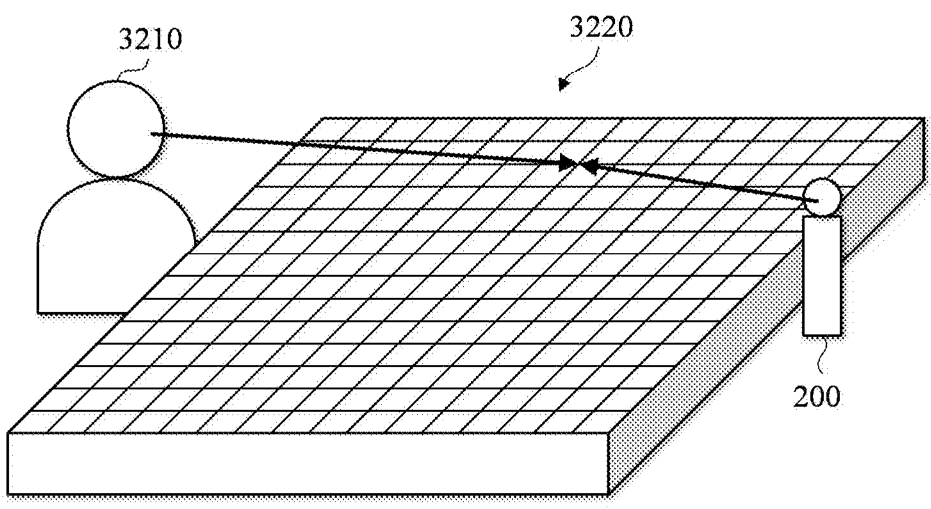
Figure 34:
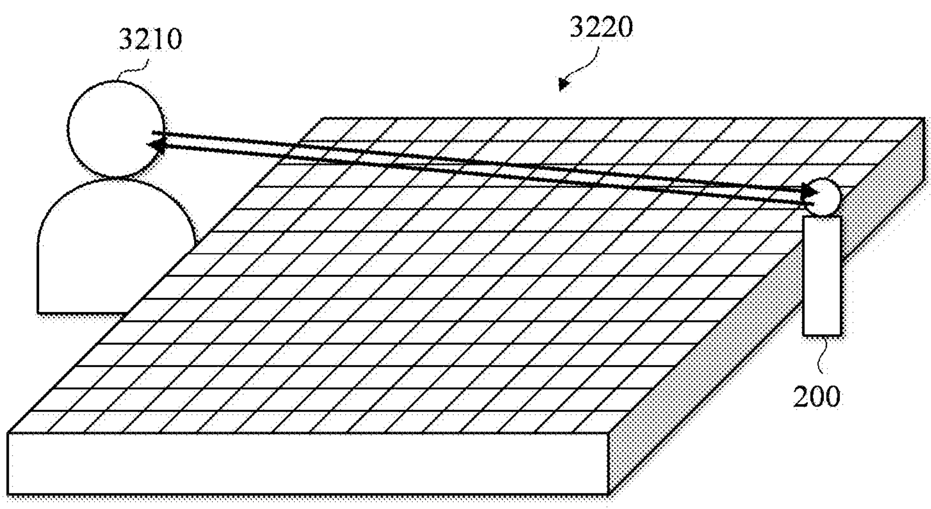

FIGS. 32 to 34 are diagrams illustrating an example of a method of controlling the camera based on a gaze of a user in an embodiment of the present disclosure.

FIG. 32 illustrates an example in which when recognizing that a user 3210 looks at the right of the user 3210, the target tracking apparatus 200 rotates the camera 310 to the left of the target tracking apparatus 200. Likewise, FIG. 33 illustrates an example in which when recognizing that the user 3210 looks at the left of the user 3210, the target tracking apparatus 200 rotates the camera 310 to the right of the target tracking apparatus 200. In this case, as described above, a gaze of the user 3210 may be obtained as target virtual coordinates of a virtual coordinate system 3220 based on information from a terminal device that is owned by the user 3210. The target virtual coordinates may be obtained by the terminal device owned by the user 3210 or the target tracking apparatus 200. Furthermore, FIG. 34 illustrates an example in which as the user 3210 looks at the target tracking apparatus 200, the target tracking apparatus 200 rotates the camera 310 so that the camera 310 tracks the user 3210.

Figure 35:
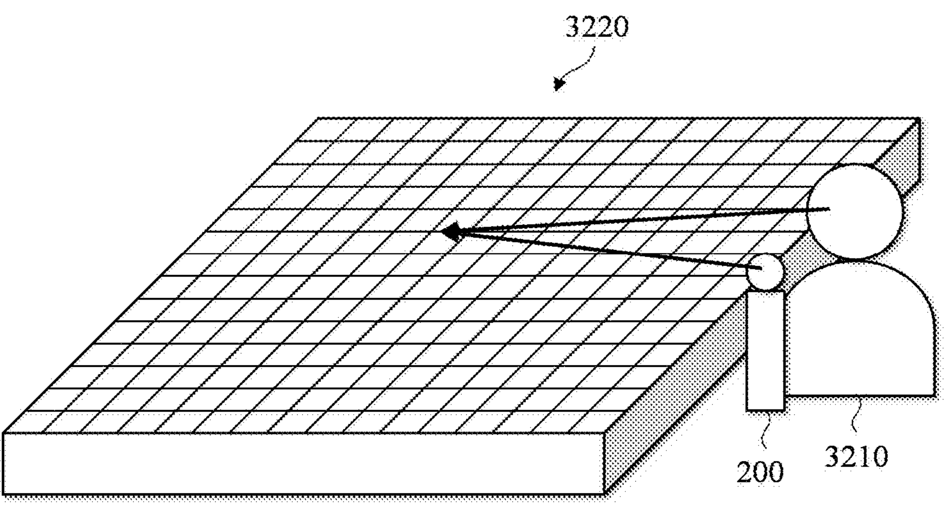
FIG. 35 is a diagram illustrating an example of a method of controlling a camera based on the head direction of a user in an embodiment of the present disclosure.

FIG. 35 is a diagram illustrating an example of a method of controlling the camera based on the head direction of a user in an embodiment of the present disclosure. FIG. 35 illustrates an example in which the target tracking apparatus 200 rotates the camera 310 so that the target tracking apparatus 200 looks at the same direction as the direction at which the user 3210 looks, based on information that is obtained by a terminal device owned by the user 3210 in a situation in which the user 3210 and the target tracking apparatus 200 look at the same direction.

If such a head tracking mode (i.e., a tracking mode for tracking a gaze or head direction) and the aforementioned face tracking function (i.e., a tracking mode using face registration) are simultaneously activated, the target tracking apparatus 200 may control the camera 310 of the target tracking apparatus 200 through the face tracking function by assigning priority to the face tracking function while head tracking operates. For example, when a registered face appears on a screen while the rotation of the camera 310 is controlled in the head tracking mode, the registered face may be tracked by using the face tracking function to which priority has been assigned.

In still another embodiment, the target tracking apparatus 200 may change a gimbal control mode by using the trigger 340. For example, a pan mode, a Fallow mode, a first person view (FPV) mode, a lock mode, and a none mode may be sequentially set in the target tracking apparatus 200 whenever the trigger 340 is pressed. In this case, when the trigger 340 is held in the state in which the trigger 340 has been pressed in a specific mode, a set mode may be activated. As a more detailed example, after a user sets the pan mode by pressing the trigger 340 and then holds the trigger 340 in the state in which the trigger 340 has been pressed, the pan mode may be activated.

In this case, information on the activated mode may be displayed on a screen.

Figure 36:
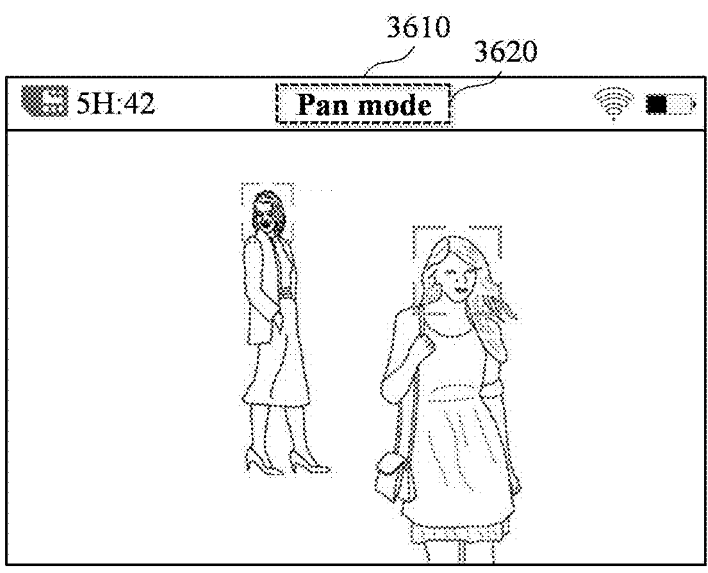
FIG. 36 is a diagram illustrating an example in which information on a mode that is activated through a trigger is displayed in an embodiment of the present disclosure.

FIG. 36 is a diagram illustrating an example in which information on a mode that is activated through the trigger is displayed in an embodiment of the present disclosure. A screen 3610 of FIG. 36 illustrates an example in which information for indicating that the pan mode has been activated by pressing the trigger 340 has been indicated as in a dotted box 3620. In this case, the information indicated in the dotted box 3620 may be implemented so that the indication of the information is released after a given time (e.g., 1.5 second).

The pan mode may be a mode in which roll and tilt axes are locked except a pan axis. For example, in the pan mode, a motor axis (i.e., the pan axis) for left and right rotation on the main body side may smoothly move in the moving direction of a tracking target. The remaining motor axes (i.e., the roll axis and the tilt axis) may maintain the direction of the camera, such as horizontal and vertical directions, while performing a shaking correction.

The Fallow mode may be a mode in which the roll axis is locked except the pan and tilt axes. For example, in the Fallow mode, a left and right rotation motor axis (i.e., the pan axis) on the main body side and an up and down rotation motor axis (i.e., the tilt axis) on the left of the lens of the camera may smoothly move in the moving direction of the target. A horizontal rotation motor axis (i.e., the roll axis) behind the camera may maintain the horizontality of the camera while performing a shaking correction.

The FPV mode may be a mode in which all of the pan, roll, and tilt axes may operate. For example, in the FPV mode, the three axes of the pan axis, the roll axis, and the tilt axis may smoothly move in the moving direction of a tracking target while performing a shaking correction.

The lock mode may be a mode in which all of the pan, roll, and tilt axes are locked. For example, in the lock mode, the three axes of the pan axis, the roll axis, and the tilt axis may maintain left and right, up and down, and horizontal states while performing a shaking correction.

The none mode may be a mode in which any gimbal control mode is not activated in the state in which the trigger button has been held.

In another embodiment, the target tracking apparatus 200 may provide a longitudinal mode.

Figure 37:
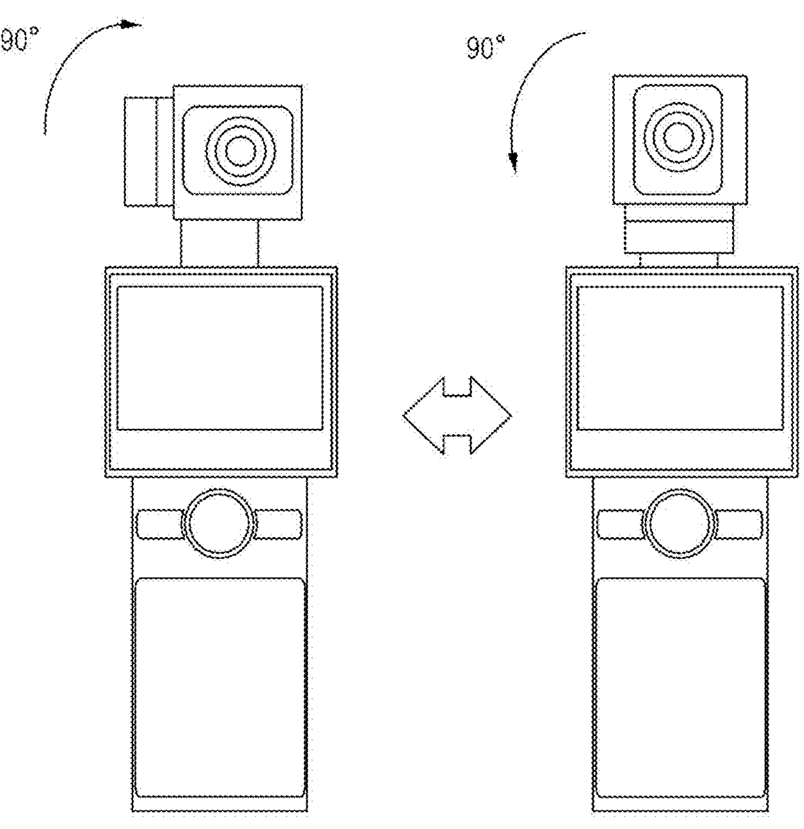
FIG. 37 is a diagram illustrating an example of a transverse mode and longitudinal mode of the target tracking apparatus according to an embodiment of the present disclosure.

FIG. 37 is a diagram illustrating an example of a transverse mode and longitudinal mode of the target tracking apparatus according to an embodiment of the present disclosure. When the transverse mode switches into the longitudinal mode, a mode may be automatically changed into the Fallow mode. In some embodiments, in the longitudinal mode, some modes may not be supported. When the transverse mode switches into the longitudinal mode, the roll axis motor may be locked while being counterclockwise rotated by 90°, so that the tilt axis motor is disposed downward from the camera. Furthermore, a screen ratio may be changed from horizontality to verticality (e.g., changes from 9:16 to 16:9).

Figure 38:
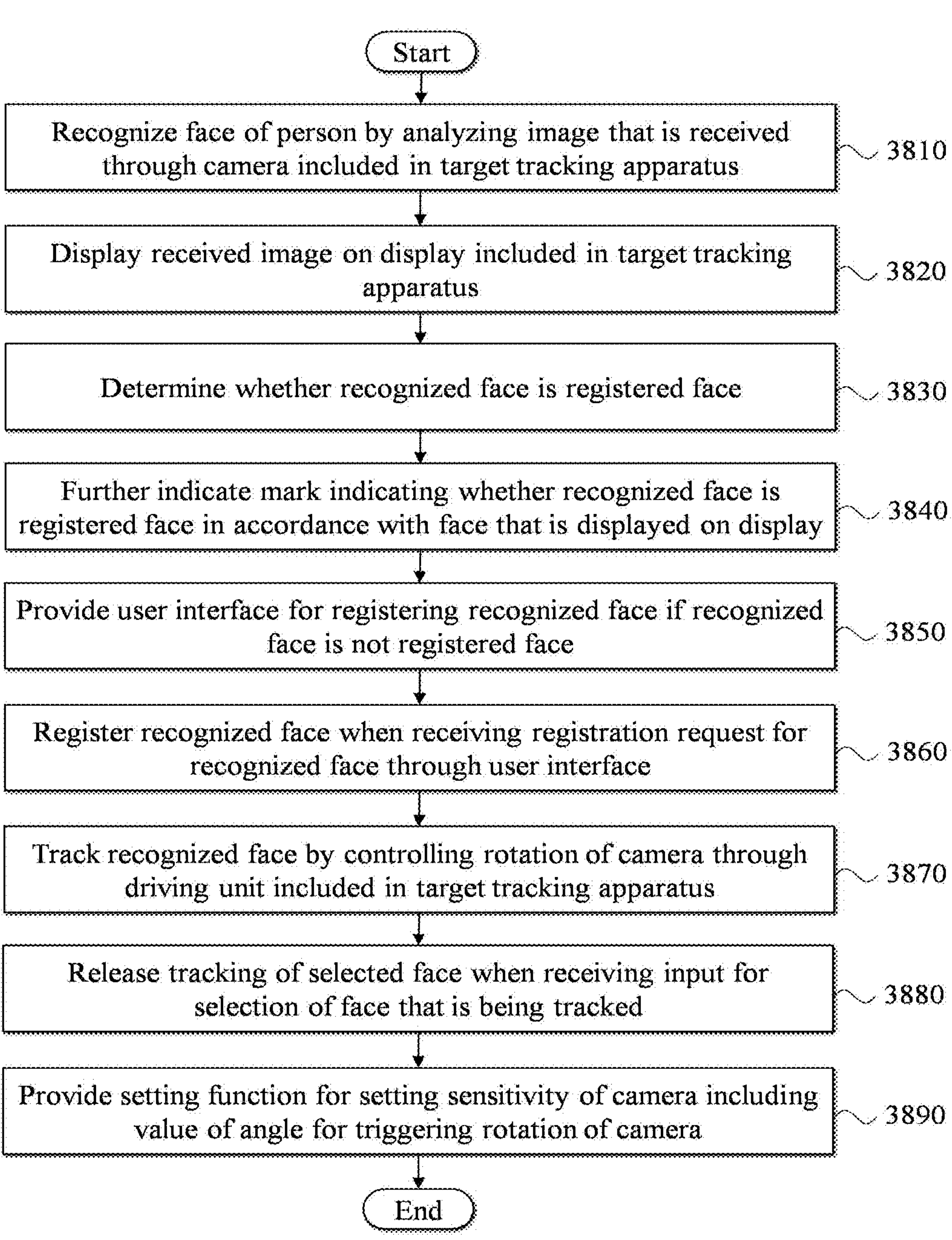
FIG. 38 is a flowchart illustrating an example of a target tracking method according to an embodiment of the present disclosure.

FIG. 38 is a flowchart illustrating an example of a target tracking method according to an embodiment of the present disclosure. The target tracking method according to the present embodiment may be performed by the controller 240 of the target tracking apparatus 200 that has been described with reference to FIG. 2. The controller 240 may correspond to the processor 120 that has been described with reference to FIG. 1. For example, the processor 120 of the computer device 100 included in the target tracking apparatus 200 may be implemented to execute a control instruction according to a code of an operating system or a code of at least one computer program included in the memory 110. In this case, the processor 120 may control the target tracking apparatus 200 so that the target tracking apparatus 200 performs steps 3810 to 3890 that are included in the method of FIG. 38 in response to a control instruction that is provided by a code stored in the computer device 100 of the target tracking apparatus 200.

In step 3810, the controller 240 may recognize a face of a person by analyzing an image that is received through the camera 310 included in the target tracking apparatus 200. A method of recognizing the face of the person in the image is not separately limited. For example, a method of recognizing the face of the person in the image may be implemented through at least one of various well-known technologies, such as machine learning and deep learning.

In step 3820, the controller 240 may display the received image on the display 320 included in the target tracking apparatus 200.

In step 3830, the controller 240 may determine whether the recognized face is a registered face. For example, an image of the registered face may be stored in the repository of the target tracking apparatus 200 along with an identifier (e.g., a number according to a registered sequence or separately designated text) of the registered face. In this case, the controller 240 may determine whether the recognized face is the registered face by comparing an image of a face that has been stored in the repository and the face that has been recognized in the image.

In step 3840, the controller 240 may further indicate a mark indicating whether the recognized face is the registered face in accordance with a face that is displayed on the display 320. For example, an example in which a face of an unregistered person is indicated through the first face registration mark 1020 with respect to an unregistered face has been described with reference to FIG. 10. An example in which a face of a registered person is indicated through the first registration face mark 1320 with respect to a registered face has been described with reference to FIG. 13. In this case, as described above, information on the sequence in which a corresponding registered face has been registered may be indicated in the first registration face mark 1320 as the identifier of the corresponding registered face. In some embodiments, designated text may be separately used as the identifier. In this case, the text may be input by a user.

In step 3850, if the recognized face is not the registered face, the controller 240 may provide a user interface for registering the recognized face. For example, examples in which a user interface for registering a recognized face is provided as in the first face registration mark 1020 of FIG. 10 and the second face registration mark 1420 of FIG. 14 have been described above.

In step 3860, when receiving a registration request for the recognized face through a user interface, the controller 240 may register the recognized face. As already described above, the controller 240 may store an image of the recognized face in a repository which may be included in the target tracking apparatus 200, in association with the identifier of the recognized face.

In step 3870, the controller 240 may track the recognized face by controlling the rotation of the camera 310 through the driving unit 220 included in the target tracking apparatus. For example, the controller 240 may control the rotation of the camera 310 by controlling at least one of the pan axis motor, the roll axis motor, and the tilt axis motor that are included in the driving unit 220.

In some embodiments, a plurality of faces may be recognized in a received image. In this case, the controller 240 may determine whether each of the plurality of faces is a registered face in step 3830. In this case, priorities may be assigned to the registered faces. For example, if two or more of a plurality of faces recognized in step 3870 are registered faces, the controller 240 may track a face that has been first registered by assigning priority to the face that has been first registered. In this case, when a face to which priority has not been assigned is selected, the controller 3870 may simultaneously track (multi-tracking) the face that has been first registered and the selected face. In this case, the selection of the face may be performed in response to an input from a user. Furthermore, for example, if two or more of a plurality of faces recognized in step 3870 are registered faces and a user selects any one of the two or more registered faces, the controller 240 may dynamically assign priority to the selected face and track the selected face. For example, if two registered faces are simultaneously tracked, the controller 240 may simultaneously track the two registered faces by tracking the location of a center point between the two registered faces. If three or more registered faces have been recognized, the controller 240 may simultaneously track the three or more registered faces by tracking the location of a center point between a registered face on the leftmost side and a registered face on the rightmost side.

In still another embodiment, if two or more of a plurality of faces recognized in step 3870 are registered faces, the controller 240 may simultaneously track the two or more registered faces without separate priority.

In step 3880, when receiving an input for the selection of a face that is being tracked, the controller 240 may release the tracking of the selected face. For example, examples in which a user releases the tracking of a specific user by selecting (e.g., tapping) the area of a mark for the face of the specific user has been described with reference to FIGS. 7 and 8.

In step 3890, the controller 240 may provide the setting function for setting the sensitivity of the camera that includes a value of an angle for triggering the rotation of the camera. In this case, the value of the angle may include a value of an angle indicating that a target being tracked has deviated from the center of a screen. In this case, the controller 240 may control the rotation of the camera based on the sensitivity of the camera that has been set through the setting function in step 3870. For example, if a value of an angle is 3° and a target being tracked deviates from the center of a screen by 3° or more, the controller 240 may control the rotation of the camera so that the target being tracked is displayed at the center of the screen. In some embodiments, step 3890 may be included prior to step 3810 or between step 3810 to step 3880.

Figure 39:
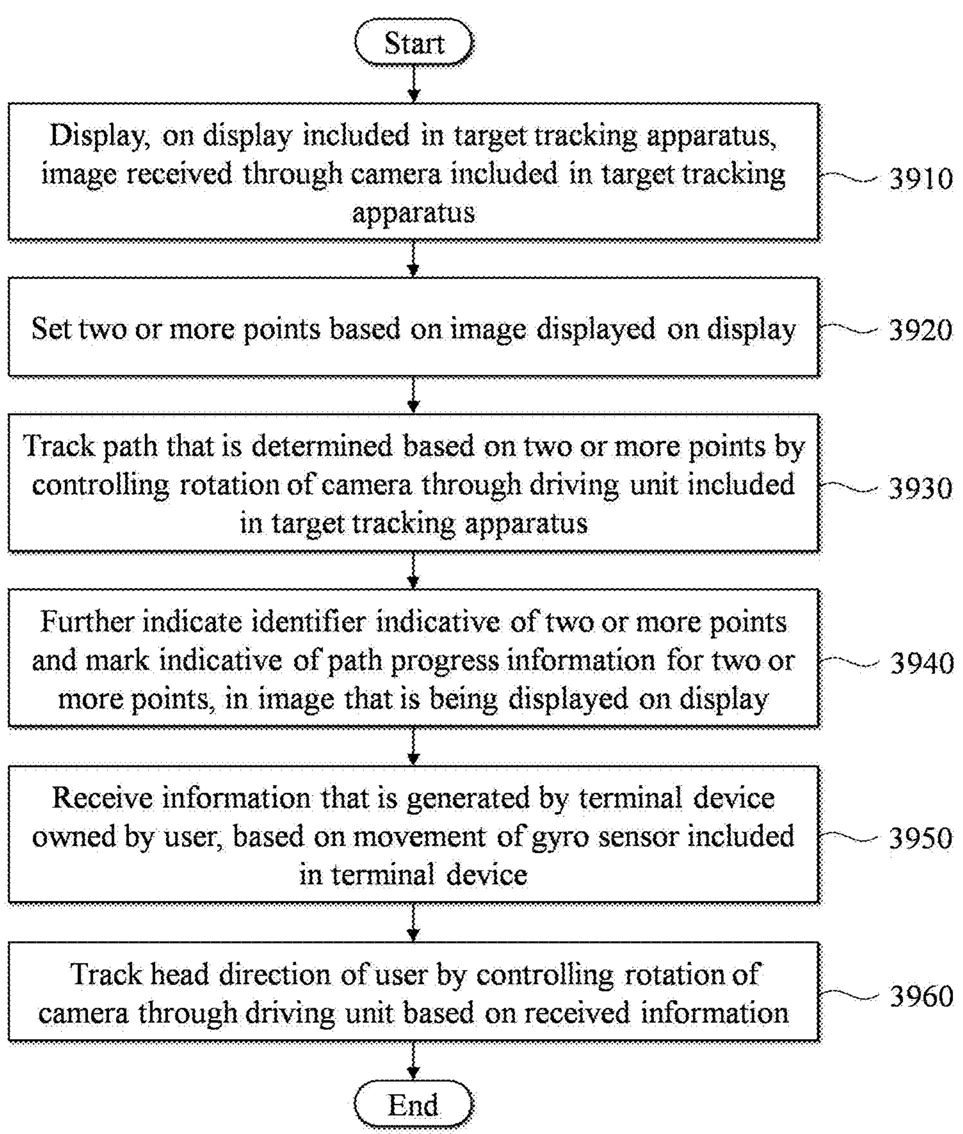
FIG. 39 is a flowchart illustrating another example of a target tracking method according to an embodiment of the present disclosure.

FIG. 39 is a flowchart illustrating another example of a target tracking method according to an embodiment of the present disclosure. The target tracking method according to the present embodiment may be performed by the controller 240 of the target tracking apparatus 200 that has been described with reference to FIG. 2. The controller 240 may correspond to the processor 120 that has been described with reference to FIG. 1. For example, the processor 120 of the computer device 100 included in the target tracking apparatus 200 may be implemented to execute a control instruction according to a code of an operating system or a code of at least one computer program included in the memory 110. In this case, the processor 120 may control the target tracking apparatus 200 so that the target tracking apparatus 200 performs steps 3910 to 3960 that are included in the method of FIG. 39 in response to a control instruction that is provided by a code stored in the computer device 100 of the target tracking apparatus 200.

In step 3910, the controller 240 may display, on the display 320 included in the target tracking apparatus 310, an image that is received through the camera 310 included in the target tracking apparatus 200.

In step 3920, the controller 240 may set two or more points based on the image that is displayed on the display 320. For example, a process of setting a plurality of points has been described with reference to FIGS. 25 to 31.

In step 3930, the controller 240 may track a path that is determined based on the two or more points by controlling the rotation of the camera 310 through the driving unit 220 included in the target tracking apparatus 200.

In some embodiments, the controller 240 may provide a photographing duration setting function for setting photographing duration. In this case, the controller 240 may control the rotation of the camera so that the camera moves along the path for the set photographing duration by using the photographing duration setting function in step 3930. The setting of photographing duration has been described with reference to FIG. 24. An example in which when duration for which an image is photographed is set, the length of the image may be automatically based on each video setting value (e.g., a double-speed and/or an interval) has been described above.

In another embodiment, the controller 240 may provide a repetition setting function for setting whether a path will be repeatedly tracked. In this case, if it has been set that the path is repeatedly tracked by using the repetition setting function in step 3930, the controller 240 may control the rotation of the camera so that the camera repeatedly tracks the path. The repetitive tracking of the path may be performed when the capacity of an SD card is full or until a separate control input is received or may be performed by a preset number of repetitions.

In still another embodiment, when a registered face appears in a received image while a path is tracked, the controller 240 may terminate the tracking of the path and track the registered face. The face tracking mode in which a face is tracked has already been described in detail. In this case, the face tracking mode may have priority over the path tracking mode.

In step 3940, the controller 240 may further indicate an identifier indicative of the two or more points and a mark indicative of path progress information for the two or more points, in an image that is being displayed on the display 320. In this case, the mark may include at least one of a first mark for indicating a path along which the camera has already moved, a second mark for indicating a path along which the camera is now moving, and a third mark for indicating a path into which the camera has not entered. An example of such marks has been described with reference to FIG. 31.

In step 3950, the controller 240 may receive information that is generated by a terminal device owned by a user, based on a movement of a gyro sensor included in the terminal device. The terminal device may be a device, such as a smartphone owned by the user, but may be implemented as a device having a form in which the device is worn on an ear or head of the user in order to obtain more accurate information on a head direction of the user.

In step 3960, the controller 240 may track the head direction of the user by controlling the rotation of the camera 310 through the driving unit 220 based on the received information. In this case, the received information may include information on target virtual coordinates that have been set based on a movement of the gyro sensor in the virtual coordinate system of the terminal device. In this case, the controller 240 may track the head direction of the user by tracking the target virtual coordinates.

In some embodiments, the controller 240 may recognize a gaze direction of the user in the image received in step 3950. In step 3960, the controller 240 may track the head direction of the user by controlling the rotation of the camera through the driving unit based on the recognized gaze direction.

The controller 240 may provide the face tracking mode in which a received image is analyzed, a recognized face of a person is registered, and the registered face is tracked and the head tracking mode in which a head direction of a recognized user is tracked. In this case, when a registered face appears in the received image while the head direction is tracked in the head tracking mode, the controller 240 may deactivate the head tracking mode and track a registered face in the face tracking mode. In other words, the face tracking mode may have priority over the head tracking mode.

Furthermore, as already described above, the target tracking apparatus 200 may include a trigger button (e.g., the trigger 340 that has been described with reference to FIG. 3). In this case, the controller 240 may sequentially select and set a plurality of gimbal control modes whenever the trigger button is pressed. As already described above, the driving unit 200 may include the pan axis, the roll axis, and the tilt axis. The plurality of gimbal control modes may include two or more gimbal control modes, among (1) the pan mode in which the roll axis and the tilt axis are locked except the pan axis, (2) the Fallow mode in which the roll axis is locked except the pan axis and the tilt axis, (3) the first person view (FPV) mode in which all of the pan axis, the roll axis, and the tilt axis can operate, (4) the lock mode in which all of the pan axis, the roll axis, and the tilt axis are locked, and (5) the non mode in which any gimbal control mode is not activated in the state in which the trigger button has been held.

Furthermore, the target tracking apparatus 200 may further display, on the display 320, information on a gimbal control mode that has been activated through the holding of the trigger button.

Furthermore, the target tracking apparatus 200 may change a mode of the camera 310 to the longitudinal mode by rotating the roll axis motor included in the driving unit 220 by 90 degrees as the mode of the camera 310 is changed from the transverse mode to the longitudinal mode, and may fix the mode of the camera 310 to the longitudinal mode. In this case, the driving unit 220 may include the pan axis motor, the roll axis motor, and the tilt axis motor. In this case, the roll axis motor may counterclockwise rotate the tilt axis motor that is disposed on the left of the camera 310 so that the tilt axis motor is disposed downward from the camera 310 in the transverse mode on the basis of the state in which the front of the target tracking apparatus 200 is viewed.

As described above, according to the embodiments of the present disclosure, a face of a person can be registered, and a recognized face of the person can be tracked when the registered face is recognized. Furthermore, the function capable of differently indicating a registered face and an unregistered face and immediately registering the unregistered face can be provided. Furthermore, a plurality of faces can be registered, and a plurality of persons can be simultaneously tracked. Furthermore, priorities for registered faces can be set, and a target can be tracked based on the set priorities. Furthermore, the tracking sensitivity of the gimbal can be set, and the rotation sensitivity of the camera can be adjusted based on the set sensitivity. Furthermore, by recognizing even a peripheral area (e.g., a shoulder line of a person or a thing) by using the plurality of recognition engines, the tracking of a target can be maintained although a face of a tracking target is not seen, and a thing that is selected by a user can be tracked. Furthermore, a path according to a plurality of points can be set, and the rotation of the camera can be automatically adjusted so that the photographing of the camera is performed along the set path. Furthermore, the user interface capable of indicating a path progress state when photographing is performed along a set path can be provided. Furthermore, a specific location of a virtual coordinate system can be tracked based on the head direction of a user or a gaze of the user. Furthermore, a target can be tracked based on priorities according to various modes. Furthermore, the gimbal control mode can be quickly set and activated or deactivated by using the trigger button. Furthermore, both the transverse mode and the longitudinal mode can be provided.

The aforementioned apparatus may be implemented as a hardware component or a combination of a hardware component and a software component. For example, the apparatus and component described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other apparatus capable of executing or responding to an instruction. The processing apparatus may perform an operating system (OS) and one or more software applications that are executed on the OS. Furthermore, the processing apparatus may access, store, manipulate, process, and generate data in response to the execution of software. For convenience of understanding, one processing apparatus has been illustrated as being used, but a person having ordinary knowledge in the art may understand that the processing apparatus may include a plurality of processing elements and/or a plurality of types of processing elements. For example, the processing apparatus may include a plurality of processors or one processor and one controller. Furthermore, another processing configuration, such as a parallel processor, is also possible.

Software may include a computer program, a code, an instruction or a combination of one or more of them, and may configure a processing apparatus so that the processing apparatus operates as desired or may instruct the processing apparatuses independently or collectively. The software and/or the data may be embodied in any type of machine, a component, a physical apparatus, virtual equipment, a computer storage medium or apparatus in order to be interpreted by the processing apparatus or to provide an instruction or data to the processing apparatus. The software may be distributed to computer systems that are connected over a network, and may be stored or executed in a distributed manner. The software and the data may be stored in one or more computer-readable recording media.

The method according to an embodiment may be implemented in the form of a program instruction executable by various computer means and stored in a computer-readable medium. The computer-readable recording medium may include a program instruction, a data file, and a data structure solely or in combination. The medium may continue to store a program executable by a computer or may temporarily store the program for execution or download. Furthermore, the medium may be various recording means or storage means having a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as a CD-ROM and a DVD, magneto-optical media such as a floptical disk, a ROM, a RAM, and a flash memory. Furthermore, other examples of the medium may include an app store in which apps are distributed, a site in which other various pieces of software are supplied or distributed, and recording media and/or storage media managed in a server. Examples of the program instruction include a high-level language code executable by a computer by using an interpreter in addition to a machine-language code, such as that written by a compiler.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The invention claimed is:

1. A target tracking method comprising:

displaying, by at least one processor of a target tracking apparatus, an image that is received through a camera of the target tracking apparatus on a display of the target tracking apparatus;

registering, by the at least one processor, a face of a person to provide a registered face;

setting, by the at least one processor, a plurality of points on the displayed image based on user input received via the target tracking apparatus; and tracking, by the at least one processor, a path determined according to the plurality of points, by controlling rotation of the camera via a driving unit included in the target tracking apparatus, such that the camera captures images while its field of view sequentially aligns with each of the plurality of points in a predetermined sequences, thereby tracking each of the plurality of points in the predetermined sequence, wherein the camera moves said its field of view between the plurality of points to track a target, wherein the method further comprises:

monitoring, by the at least one processor, whether the registered face appears in the image while the camera is tracking the path; and in response to detecting the registered face in the image, prioritizing tracking of the registered face over tracking of the path by terminating the tracking of the path and controlling the rotation of the camera to track the registered face, and wherein the tracking of the path is terminated upon detection of the registered face even if the field of view of the camera has not yet sequentially aligned with all of the plurality of points in the predetermined sequence.

2. The target tracking method of claim 1, further comprising further indicating, by the at least one processor, identifiers indicative of the plurality of points and a mark indicative of path progress information for the plurality of points in an image that is being displayed on the display.

3. The target tracking method of claim 2, wherein the mark comprises at least one of a first mark for indicating a path along which the camera has already moved, a second mark for indicating a path along which the camera is currently moving, and a third mark for indicating a path to which the camera has not entered.

4. The target tracking method of claim 1, further comprising providing, by the at least one processor, a photographing duration setting function for setting photographing duration in response to the user input received via the target tracking apparatus, wherein tracking the path comprises controlling the rotation of the camera so that the camera moves along the path for photographing duration that is set by using the photographing duration setting function.

5. The target tracking method of claim 1, further comprising providing, by the at least one processor, a repetition setting function for setting whether to repeatedly track the path in response to the user input received via the target tracking apparatus, wherein tracking the path comprises controlling the rotation of the camera so that the camera repeatedly tracks the path when the path is set to be repeatedly tracked through the repetition setting function.

6. The target tracking method of claim 1, further comprising:

receiving, by the at least one processor, information that is generated by a terminal device based on a movement of a gyro sensor included in the terminal device owned by a user; and tracking, by the at least one processor, a head direction of the user by controlling the rotation of the camera through the driving unit based on the received information.

7. The target tracking method of claim 6, wherein the received information comprises information on target virtual coordinates that are set based on the movement of the gyro sensor in a virtual coordinate system of the terminal device.

8. The target tracking method of claim 1, further comprising:

recognizing, by the at least one processor, a gaze direction of a user in the received image; and tracking, by the at least one processor, a head direction of the user by controlling the rotation of the camera through the driving unit based on the recognized gaze direction.

9. The target tracking method of claim 1, wherein the prioritizing tracking of the registered face comprises:

executing a face tracking mode in which the registered face is tracked, the face tracking mode having been set to override a path tracking mode for tracking the path, and terminating the path tracking mode; and tracking the registered face through the face tracking mode.

10. The target tracking method of claim 1, wherein:

the target tracking apparatus comprises a trigger button, and the target tracking method further comprises:

setting, by the at least one processor, a plurality of gimbal control modes by sequentially selecting the plurality of gimbal control mode whenever the trigger button is pressed; and activating, by the at least one processor, a gimbal control mode that has been currently set among the plurality of gimbal control modes when the trigger button is held in a state in which the trigger button has been pressed.

11. The target tracking method of claim 10, wherein:

the driving unit comprises a pan axis, a roll axis, and a tilt axis, and the plurality of gimbal control modes comprises at least two gimbal control modes of (1) a pan mode in which the roll axis and the tilt axis are locked except the pan axis, (2) a Fallow mode in which the roll axis is locked except the pan axis and the tilt axis, (3) a first person view (FPV) mode in which all of the pan axis, the roll axis, and the tilt axis are capable of operating, (4) a lock mode in which all of the pan axis, the roll axis, and the tilt axis are locked, and (5) a non mode in which any gimbal control mode is not activated in a state in which the trigger button has been held.

12. The target tracking method of claim 10, further comprising further displaying, by the at least one processor, information on the activated gimbal control mode on the display.

13. The target tracking method of claim 1, further comprising changing, by the at least one processor, a mode of the camera to a longitudinal mode by rotating a roll axis motor included in the driving unit by 90 degrees and fixing the rotated roll axis motor when the mode of the camera is changed from a transverse mode to the longitudinal mode.

14. The target tracking method of claim 13, wherein:

the driving unit comprises a pan axis motor, a roll axis motor, and a tilt axis motor, and the roll axis motor is counterclockwise rotated so that the tilt axis motor disposed on a left of the camera is disposed downward from the camera in the transverse mode based on a state in which a front of the target tracking apparatus is viewed.

15. A non-transitory computer-readable recording medium on which a computer program is recorded in order to execute the method according to claim 1 in a computer device.

16. A target tracking apparatus comprising:

at least one processor implemented to execute a computer-readable instruction;

a camera receiving an image;

a display displaying the received image; and a driving unit rotating the camera, wherein the at least one processor is implemented to:

display, on a display, an image that is received through the camera;

register a face of a person to provide a registered face;

set a plurality of points on the displayed image based on user input received via the target tracking apparatus; and track a path determined according to the plurality of points, by controlling rotation of the camera via a driving unit included in the target tracking apparatus, such that the camera captures images while its field of view sequentially aligns with each of the plurality of points in a predetermined sequences, thereby tracking each of the plurality of points in the predetermined sequence, wherein the camera moves said its field of view between the plurality of points to track a target, wherein the at least one processor is implemented to monitor whether the registered face appears in the image while the camera is tracking the path; and in response to detecting the registered face in the image, prioritize tracking of the registered face over tracking of the path by terminating the tracking of the path and controlling the rotation of the camera to track the registered face, and wherein the tracking of the path is terminated upon detection of the registered face even if the field of view of the camera has not yet sequentially aligned with all of the plurality of points in the predetermined sequence.

17. The target tracking apparatus of claim 16, wherein:

the at least one processor provides a photographing duration setting function for setting photographing duration in response to the user input received via the target tracking apparatus, and in order to track the path, the at least one processor controls the rotation of the camera so that the camera moves along the path for photographing duration that is set by using the photographing duration setting function.

18. The target tracking apparatus of claim 16, wherein:

the at least one processor provides a repetition setting function for setting whether to repeatedly track the path in response to the user input received via the target tracking apparatus, and in order to track the path, the at least one processor controls the rotation of the camera so that the camera repeatedly tracks the path when the path is set to be repeatedly tracked through the repetition setting function.

* * * * *